United States Patent
Yamanaka et al.

(10) Patent No.: US 7,076,563 B1
(45) Date of Patent: Jul. 11, 2006

(54) DIGITAL CONTENT DOWNLOADING SYSTEM USING NETWORKS

(75) Inventors: Hideaki Yamanaka, Tokyo (JP); Teruhiko Moriyama, Tokyo (JP); Katsuaki Kikuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 970 days.

(21) Appl. No.: 09/690,010

(22) Filed: Oct. 17, 2000

(30) Foreign Application Priority Data

Jan. 31, 2000 (JP) ............................... 2000-22567

(51) Int. Cl.
*G06F 15/16* (2006.01)
(52) U.S. Cl. .................................... 709/233; 709/252
(58) Field of Classification Search ................ 709/226, 709/232, 252, 235, 217, 219, 233; 370/240, 370/446, 466
See application file for complete search history.

(56) References Cited

U.S. PATENT DOCUMENTS

| | | | |
|---|---|---|---|
| 5,539,564 A * | 7/1996 | Kumozaki et al. .............. 398/2 |
| 5,608,446 A * | 3/1997 | Carr et al. .................... 725/114 |
| 5,808,764 A * | 9/1998 | Frigo et al. ..................... 398/72 |
| 5,808,767 A * | 9/1998 | Williams et al. ............... 398/70 |
| 5,828,737 A * | 10/1998 | Sawyer ................... 379/114.07 |
| 5,917,822 A * | 6/1999 | Lyles et al. ............... 370/395.4 |
| 6,091,740 A * | 7/2000 | Karasawa .................... 370/458 |
| 6,288,809 B1 * | 9/2001 | Touma et al. ................... 398/9 |
| 6,362,908 B1 * | 3/2002 | Kimbrough et al. ......... 398/164 |
| 6,414,768 B1 * | 7/2002 | Sakata et al. .................. 398/59 |

(Continued)

FOREIGN PATENT DOCUMENTS

EP    0 869 634    10/1998

(Continued)

OTHER PUBLICATIONS

Nam Jae-Hyun; Jang Jong-Wook; Lee Jung-Tae; "Design of the MAC frame structure regardless of contention in ATM-PON" Communication Technology Proceedings, 1998. ICCT '98. 1998 International Conference on , Volume: vol. 2 , Oct. 22-24, 1998 pp.:5 pp. vol. 2.*

(Continued)

*Primary Examiner*—Marc D. Thompson
(74) *Attorney, Agent, or Firm*—Oblon, Spivak, McClelland, Maier & Neustadt, P.C.

(57) ABSTRACT

An optical network unit of each consumer is connected to an optical line terminator of a network operator through a subscriber line formed of an optical fiber. When a particular consumer desires to download digital content from a content retailer to the particular consumer through a network of the network operator, the particular consumer requests a bandwidth reservation of a resource reservation server of the network operator, so that a transmission condition composed of a bandwidth and a time zone is reserved in cases where the downloading of the digital content at the transmission condition is possible. Thereafter, the bandwidth reservation is sent to a downward bandwidth managing unit, and the digital content is downloaded from the content retailer to the particular consumer through the network of the network operator at the transmission condition according to the bandwidth reservation under control of the downward bandwidth managing unit. Accordingly, a time period required for the downloading of the digital content can be easily predicted, and an operational efficiency of the downloading can be improved.

18 Claims, 19 Drawing Sheets

U.S. PATENT DOCUMENTS

| | | | |
|---|---|---|---|
| 6,434,164 B1 * | 8/2002 | Matsunaga et al. | 370/443 |
| 6,445,472 B1 * | 9/2002 | Kim et al. | 398/79 |
| 6,546,014 B1 * | 4/2003 | Kramer et al. | 370/395.41 |
| 6,587,239 B1 * | 7/2003 | Hung | 398/79 |
| 6,600,581 B1 * | 7/2003 | Fatehi et al. | 398/9 |
| 6,631,134 B1 * | 10/2003 | Zadikian et al. | 370/395.21 |
| 6,757,251 B1 * | 6/2004 | Nakaishi | 370/236.2 |

FOREIGN PATENT DOCUMENTS

| | | |
|---|---|---|
| JP | 9-261196 | 10/1997 |
| JP | 10-336186 | 12/1998 |
| JP | 11-225169 | 8/1999 |
| JP | 11-331229 | 11/1999 |
| WO | WO 98/18235 | 4/1998 |

OTHER PUBLICATIONS

Bicker, B.; Knuckey, M.; "Bandwidth utilisation options for passive optical networks" Customer Access—the Last 1.6 km, IEE Colloquium on , Jun. 1, 1993 pp.:1/1-1/9.*

Bo Li; Yang Qin; "Traffic scheduling in a photonic packet switching system with QoS guarantee" Lightwave Technology, Journal of , vol.: 16 , Issue: 12 , Dec. 1998 pp. 2281-2295.*

R. Watanabe, et al., The Journal of the Institute of Electronics, Information and Communication Engineers, vol. 82, No. 3, pp. 213-217, "The Way to FTTH (Fiber to the Home)", Mar. 1999.

* cited by examiner

USED TIME ZONE

| USED BANDWIDTH | 7:00 AM — 7:00 PM | 7:00 PM — 9:00 PM | 9:00 PM — 7:00 AM |
|---|---|---|---|
| 1 Mb/s | ¥1.00/min | ¥0.60/min | ¥0.50/min |
| 2 Mb/s | ¥1.41/min | ¥0.85/min | ¥0.71/min |
| 5 Mb/s | ¥2.23/min | ¥1.34/min | ¥1.16/min |
| 10 Mb/s | ¥3.16/min | ¥1.90/min | ¥1.58/min |
| 20 Mb/s | ¥4.47/min | ¥2.68/min | ¥2.24/min |
| 50 Mb/s | ¥7.07/min | ¥4.24/min | ¥3.54/min |
| 100 Mb/s | ¥1.000/min | ¥6.00/min | ¥5.00/min |

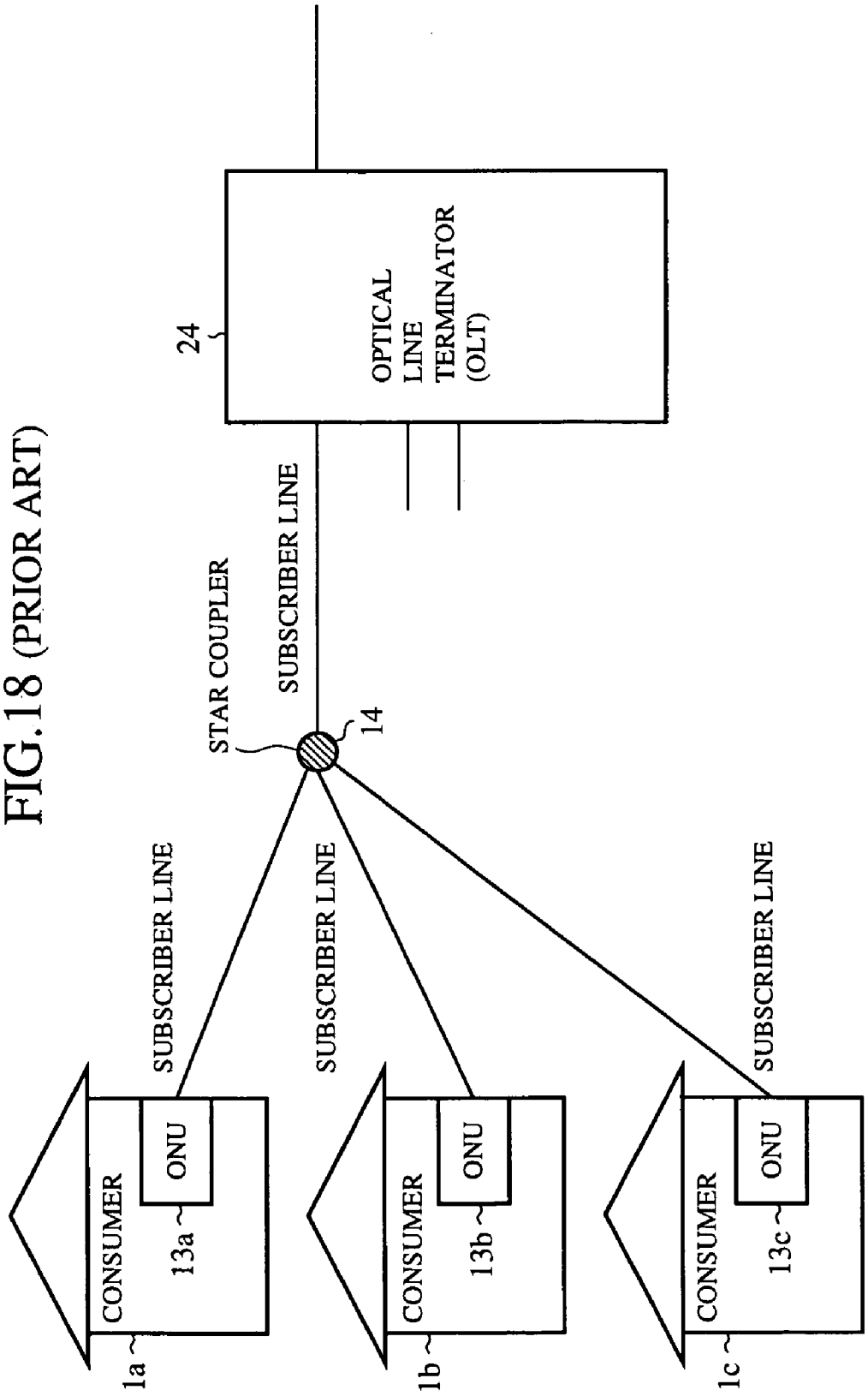

DIGITAL CONTENT DOWNLOADING SYSTEM USING NETWORKS

BACKGROUND OF THE INVENTION

1. Field of the Invention

The present invention relates to a digital content downloading system in which digital content such as music files, video files, game software titles and so on are downloaded to a plurality of consumers through networks.

2. Description of Related Art

In a current business field using a communication network, the interest of people has been changed from "technology-oriented" to "service-oriented". In particular, people have paid attention to the Asynchronous Transfer Mode (ATM) as a technique guaranteeing the Quality of Service (QOS) indicating the communication quality. In an ATM network with the appropriate network managing performance, various types of traffic such as the internet protocol (IP), frame relay and voice can be simultaneously processed, and the service quality for the digital content can be easily guaranteed. Therefore, the ATM network is expected as a strong tool for digital content delivery.

Also, if network managing functions of ATM networks are available, a business using networks can be easy by utilizing various QOS classes such as Variable Bit Rate (VBR), non-real time service classes and so on, which means the business becomes "service-quality oriented" instead of "technology-oriented". For example, to provide a technology service for consumers, a highly-efficient QOS class can be used in stead of a simple class of Constant Bit Rate (CBR). The technology of the network management is not only used for the management of hardware such as routers, switches and so on, but also used as a means of "service management".

This strict service management is feasible because the ATM network has a high-performance QOS managing capability. In the ATM networks, parameters such as a transfer bit rate (which is also called "bandwidth" in this technical field), a delay time, a delay variation, a burst size, a cell interval and a cell discard rate, thus the virtual circuit (VC) can be precisely established with QOS guarantee.

In ATM Forum, QOS characteristics of each virtual circuit are classified, and four service classes are defined. They are CBR class, real time VBR class, non-real time VBR class and available bit rate/unspecified bit rate (ABR/UBR) class.

As is described above, because the four service classes are provisioned in ATM networks, even though congestion occurs in one of the four service classes, the influence of the congestion to the other classes can be prevented. For example, even though the congestion of data traffic occurs in an ATM switch, voice or video traffic belonging to the CBR class can be stably transmitted.

Also, charging of downloading of digital content to each consumer using ATM networks has been studied. To maintain a competitive edge in public network services, a fixed charge for the digital content download is not proper, but a policy of determining a charge depending on a type of the digital content or a downloading quality of the digital content is desired. For example, in many proposals of charging mechanisms, it is applicable that a charge for a CBR service be higher than that for a best effort type UBR service. Also, it is proposed that a charge for digital content be selected by a time zone, or that a charge for the digital content be decided in proportion to a bandwidth used for downloading or a service time zone.

In these proposals, a consumer who downloads digital content is charged in dependence on not only types of the digital content such as music files, video files of a cinema or map and game software titles but also the quality or time of downloading digital content. Therefore, the charging mechanism depending on how to use networks is possible.

FIG. 18 is a diagram showing the configuration of an optical access network of a conventional digital content downloading system. This optical access network of the conventional digital content downloading system is disclosed in a paper of the Institute of Electronic Information and Communication Engineers, Vol. 82, No. 3, pp. 213–217, March, 1999. This type of the optical access network is generally called the Passive Optical Network (PON) system. The optical access network connects a plurality of consumers to a network operator through a subscriber line, which is an optical fiber.

In FIG. 18, each of reference numerals 1a, 1b and 1c indicates a consumer who purchases digital content, each of reference numerals 13a, 13b and 13c indicates an optical network unit (ONU) which denotes a terminator of a branch subscriber line formed of an optical fiber. The optical network units 13a, 13b and 13c are arranged in houses or offices of the consumers 1a, 1b and 1c. Also, a reference numeral 24 indicates an optical line terminator (OLT), arranged in an office of a network operator, for terminating a main subscriber line formed of an optical fiber, and a reference numeral 14 indicates a star coupler, connecting the branch subscriber lines to the main subscriber line, for distributing optical signals transmitting through the main subscriber line to the branch subscriber lines and transferring optical signals transmitting through each branch subscriber line to the main subscriber line.

In the above configuration, an operation of the optical access network (or the PON system) of the conventional digital content downloading system is described. Time slots of digital content to be transmitted from the optical line terminator 24 to the consumers 1a, 1b and 1c are distributed to the branch subscriber lines of the consumers 1a, 1b and 1c in the star coupler 14, and one time slot of the digital content to be transmitted to one consumer 1a, 1b or 1c is received in the corresponding optical network unit (ONU) 13a, 13b or 13c for each consumer.

FIG. 19 is a conceptual diagram of a bandwidth allocation in one subscriber line utilized in the PON system. As shown in FIG. 19, a total bandwidth (or a total data transfer rate) usable in one optical fiber forming the main subscriber line or each branch subscriber line is divided into a fixed bandwidth, which is allocated for a telephone, an integrated service digital network (ISDN) and so on, and a shared bandwidth fairly allocated for the consumers.

FIG. 20 is a diagram showing an allocation of the conventional bandwidth example for one subscriber line. The shared bandwidth of 10 Mb/s in one subscriber line is divided into a plurality of bandwidth fields allocated to a plurality of consumers. As shown in FIG. 20, the shared bandwidth is fairly shared among consumers on the same branch.

However, in the digital content downloading system using the conventional optical access network, if a large number of consumers 1a, 1b and 1c simultaneously download a large-capacity file of digital content, not only each consumer feels that a data transmission speed of the digital content is low, but also data loss may occur in the transmission of the digital content because the bandwidth allocated to each consumer is not sufficient. Re-transmission of the digital content is required in case of data loss. As a result, traffic of the subscriber line connected to the optical line terminator (OLT) of the network operator is increased more and more, which make other downloading of other consumers 1*a*, 1*b* and 1*c* fail. Usually, the number of consumers accommodated by one star coupler 14 is 16 to 32.

As shown in FIG. 20, a bandwidth usable for each consumer greatly changes when the number of consumers changes. Therefore, there is another drawback that it is difficult to predict a time period required to download the digital content to each consumer, so that operational efficiency of the digital content downloading may considerably becomes worse.

SUMMARY OF THE INVENTION

An object of the present invention is to provide, with due consideration to the drawbacks of the conventional digital content downloading system using the optical access network, a digital content downloading system using a network in which a time period required for downloading of digital content is easily predicted and operational efficiency of the digital content downloading is improved.

The object of the present invention is achieved by the provision of a digital content downloading system using a network in which digital content possessed by a digital content retailer is downloaded to one of a plurality of consumers through a network, comprising:

a plurality of subscriber lines which each are formed of an optical fiber and are arranged between the consumers and the network managed by a network operator;

an optical line terminator, arranged on a side of the network, for terminating one subscriber line on the network side;

an optical network unit, arranged on a side of each consumer, for terminating one subscriber line on the consumer side;

a star coupler for connecting the subscriber lines terminated by the optical network units to the subscriber line terminated by the optical line terminator;

a resource reservation server for reserving a particular bandwidth for the digital content in the subscriber lines in response to a request by a particular consumer; and downward bandwidth managing means, arranged in the optical line terminator, for controlling the downloading of the digital content from the digital content retailer to the optical network unit of the particular consumer to transmit the digital content through the subscriber lines and the star coupler at the particular bandwidth reserved by the resource reservation server.

In the above configuration, a particular bandwidth (or a particular transfer rate) required to download the digital content to the particular consumer is reserved by the resource reservation server in response to a request by the particular consumer before the downloading of the digital content. Thereafter, the digital content is downloaded from the digital content retailer to the optical network unit of the particular consumer while the downward bandwidth managing means controls the transmission of the digital content to make the digital content transmit through the subscriber lines and the star coupler at the particular bandwidth reserved by the resource reservation server.

Accordingly, because the particular consumer can exclusively use the particular bandwidth for the digital content in the subscriber lines, a probability that the digital content is successfully downloaded to the particular consumer can be increased, a time period required for the downloading of the digital content can be easily predicted, and a transmission efficiency for the downloading of the digital content can be improved.

It is preferred that the particular bandwidth for the digital content reserved by the resource reservation server in response to the request by the particular consumer is guaranteed in a shared bandwidth of the subscriber lines.

Therefore, the particular bandwidth for the digital content can be reliably guaranteed.

It is also preferred that the particular bandwidth for the digital content reserved by the resource reservation server in response to the request by the particular consumer is guaranteed in a first signal having a wavelength which is different from that of a second signal corresponding to a shared bandwidth of the subscriber lines.

Therefore, even though the digital content is downloaded through the first signal, no influence is exerted on the consumers who transmit data through the second signal.

It is also preferred that the optical network unit arranged on the side of the particular consumer comprises:

an optical wavelength demultiplexing unit for demultiplexing a multiplexed optical signal of a first wavelength transmitting through the subscriber line;

a first optical receiving unit for receiving a plurality of optical signals of the first wavelength demultiplexed by the optical wavelength demultiplexing unit and converting the optical signals into a plurality of digital signals;

a passive optical network processing unit for extracting data of the digital content from the digital signals obtained by the first optical receiving unit;

a plurality of interfaces, connected to a plurality of terminals in one-to-one correspondence, for respectively transmitting data matching with the corresponding terminal to the corresponding terminal; and a destination judging and header processing unit for judging the destination of the data of the digital content extracted by the passive optical network processing unit to determine a particular terminal to which the data of the digital content is downloaded, performing a header processing for the data of the digital content to identify the digital content retailer, and transmitting the data of the digital content to the particular terminal through one interface corresponding to the particular terminal.

In the above configuration, because the destination of the data of the digital content is judged, the data of the digital content is transmitted to the particular terminal which is judged to be the destination of the data of the digital content.

Accordingly, various types of traffic such as an internet protocol (IP), frame relay and voice can be simultaneously processed in an asynchronous transfer mode (ATM), and each type of digital content can be transmitted to the terminal which is judged to be the destination of the digital content.

It is also preferred that the optical network unit arranged on the side of the particular consumer comprises:

an optical wavelength demultiplexing unit for demultiplexing a first multiplexed optical signal of a first wavelength transmitting through the subscriber line to a plurality of first optical signals of the first wavelength and demultiplexing a second multiplexed optical signal of a second wavelength transmitting through the subscriber line to a plurality of second optical signals of the second wavelength, the second multiplexed optical signal including data of the digital content of which the particular bandwidth is reserved by the resource reservation server;

a first optical receiving unit for receiving the first optical signals of the first wavelength from the optical wavelength demultiplexing unit and converting the first optical signals into a plurality of first digital signals;

a second optical receiving unit for receiving the second optical signals of the second wavelength from the optical wavelength demultiplexing unit and converting the second optical signals into a plurality of second digital signals;

a passive optical network processing unit for extracting the data of the digital content from the second digital signals obtained by the second optical receiving unit;

a plurality of interfaces, connected to a plurality of terminals in one-to-one correspondence, for respectively transmitting data matching with the corresponding terminal to the corresponding terminal; and a destination judging and header processing unit for judging the destination of the data of the digital content extracted by the passive optical network processing unit to determine a particular terminal to which the data of the digital content is downloaded, performing a header processing for the data of the digital content to identify the digital content retailer, and transmitting the data of the digital content to the particular terminal through one interface corresponding to the particular terminal.

In the above configuration, the first multiplexed optical signal, of which the bandwidth is divided into a fixed bandwidth and a shared bandwidth, and the second multiplexed optical signal, in which the data of the digital content is included at the particular bandwidth, are received. Therefore, the reception of the first multiplexed optical signal of the first wavelength has no relation to the reception of the second multiplexed optical signal of the second wavelength.

Accordingly, even though the digital content is downloaded with the second multiplexed optical signal, no influence is exerted on the reception of the first multiplexed optical signal.

It is also preferred that the network operator charges the particular consumer for the downloading of the digital content according to the particular bandwidth reserved by the resource reservation server, a time period used for the downloading or a time zone used for the downloading.

A probability that the particular consumer uselessly performs a bandwidth reservation is reduced, so that the particular consumer can efficiently use the bandwidth.

It is also preferred that information of charges corresponding to a bandwidth used for the downloading of data including the digital content, a time period used for the downloading of data including the digital content or a time zone used for the downloading of data including the digital content is transmitted from the network operator to the consumers.

Each consumer can know a charge for the downloading of data to the consumer. Therefore, a probability that the consumer uselessly performs a bandwidth reservation is reduced.

The object of the present invention is also achieved by the provision of a digital content downloading system using a network in which digital content possessed by one of a plurality of digital content retailers is downloaded to a consumer through a network, comprising:

a plurality of subscriber lines which each are formed of an optical fiber and are arranged between the digital content retailers and the network managed by a network operator;

an optical line terminator, arranged on a side of the network, for terminating one subscriber line on the network side;

an optical network unit, arranged on a side of each digital content retailer, for terminating one subscriber line on the digital content retailer side;

a star coupler for connecting the subscriber lines terminated by the optical network units to the subscriber line terminated by the optical line terminator;

a resource reservation server for reserving a particular bandwidth for the digital content in the subscriber lines for the downloading of the digital content to the consumer as a bandwidth reservation in response to a request by a particular digital content retailer;

upward bandwidth managing means, arranged in the optical line terminator, for receiving the bandwidth reservation from the resource reservation server; and upward transmission control means, arranged in the optical network unit of a particular digital content retailer, for controlling the downloading of the digital content from the optical network unit of the particular digital content retailer to the consumer to transmit the digital content through the subscriber lines and the star coupler at the particular bandwidth according to the bandwidth reservation received from the upward bandwidth managing means.

In the above configuration, a particular bandwidth (or a particular transfer rate) required to download the digital content from the particular digital content retailer is reserved by the resource reservation server in response to a request by the particular digital content retailer before the downloading of the digital content. Thereafter, when the upward bandwidth managing means receives the bandwidth reservation from the resource reservation server, the bandwidth reservation is sent to the upward transmission control means, and the digital content is downloaded from the optical network unit of the particular digital content retailer to the consumer while the upward transmission control means controls the digital content so as to transmit through the subscriber lines and the star coupler at the particular bandwidth.

Accordingly, because the particular digital content retailer can exclusively use the particular bandwidth for the digital content in the subscriber lines, a probability that the digital content is successfully downloaded from the particular digital content retailer can be increased, a time period required for the downloading of the digital content can be easily predicted, and an operational efficiency for the downloading of the digital content can be improved.

It is preferred that the particular bandwidth for the digital content reserved by the resource reservation server in response to the request by the particular digital content retailer is guaranteed in a shared bandwidth of the subscriber lines.

Therefore, the particular bandwidth for the digital content can be reliably guaranteed.

It is preferred that the particular bandwidth for the digital content reserved by the resource reservation server in response to the request by the particular digital content retailer is guaranteed in a first signal having a wavelength differing from that of a second signal corresponding to a shared bandwidth of the subscriber lines.

Therefore, even though the digital content is downloaded through the first signal, no influence is exerted on the digital content retailers who transmit data through the second signal.

It is also preferred that the optical network unit arranged on the side of the particular digital content retailer, comprising:

an interface for receiving data of the digital content from an external terminal;

a quality-of-service control unit for controlling the transmission of the data of the digital content received in the interface according to the bandwidth reservation received by the upward transmission control means;

a passive optical network processing unit for controlling a transmission timing of the data of the digital content, of which the transmission is controlled in the quality-of-service control unit, to prevent the interference of the data of the digital content with data transmitted from the other optical network units;

a first optical transmitting unit for converting the data of the digital content, of which the transmission timing is controlled in the passive optical network processing unit, into a plurality of optical signals having a first wavelength and transmitting the optical signals; and an optical wavelength multiplexing unit for multiplexing the optical signals transmitted from the first optical transmitting unit to a multiplexed optical signal and outputting the multiplexed optical signal to the corresponding subscriber line.

In the above configuration, the data of the digital content is transmitted at the particular bandwidth under the control of the quality-of-service control unit. Also, even though pieces of data are output from the other optical network units, the interference of the data of the digital content with the pieces of data is prevented under the control of the passive optical network processing unit.

Accordingly, the data of the digital content can be reliably transmitted at the particular bandwidth, and various types of traffic such as an internet protocol (IP), frame relay and voice can be simultaneously processed.

It is also preferred that the optical network unit arranged on the side of the particular digital content retailer, comprising:

an interface for receiving first data and second data of the digital content from an external terminal;

a quality-of-service control unit for controlling the transmission of the first data and controlling the transmission of the second data of the digital content received in the interface according to the bandwidth reservation received by the upward transmission control means;

a passive optical network processing unit for controlling transmission timings of the first data and the second data of the digital content, of which the transmission is controlled in the quality-of-service control unit, to prevent the interference of the first data and the second data of the digital content with data transmitted from the other optical network units;

a first optical transmitting unit for converting the first data, of which the transmission timing is controlled in the passive optical network processing unit, into a plurality of first optical signals having a first wavelength and transmitting the first optical signals;

a second optical transmitting unit for converting the data of the digital content, of which the transmission timing is controlled in the passive optical network processing unit, into a plurality of second optical signals having a second wavelength differing from the first wavelength and transmitting the second optical signals; and an optical wavelength multiplexing unit for multiplexing the first optical signals transmitted from the first optical transmitting unit to a first multiplexed optical signal, multiplexing the second optical signals transmitted from the second optical transmitting unit to a second multiplexed optical signal, and outputting the first multiplexed optical signal and the second multiplexed optical signal to the corresponding subscriber line.

In the above configuration, the first data is transmitted at a bandwidth guaranteed in a shared bandwidth of the first multiplexed optical signal, and the second data of the digital content is transmitted at the particular bandwidth guaranteed in the bandwidth of the second multiplexed optical signal. Therefore, the transmission of the first data has no relation to the transmission of the second data of the digital content.

Accordingly, even though the digital content is downloaded with the second multiplexed optical signal, no influence is exerted on the transmission of the first data.

It is also preferred that the network operator charges the particular digital content retailer for the downloading of the digital content according to the particular bandwidth reserved by the resource reservation server, a time period used for the downloading or a time zone used for the downloading.

A probability that the particular digital content retailer uselessly performs a bandwidth reservation is reduced, so that the particular digital content retailer can efficiently use the bandwidth.

It is also preferred that information of charges corresponding to a bandwidth used for the downloading of data including the digital content, a time period used for the downloading of data including the digital content or a time zone used for the downloading of data including the digital content is transmitted from the network operator to the digital content retailers.

Each digital content retailer can know a charge for the downloading of data from the digital content retailer. Therefore, a probability that the digital content retailer uselessly performs a bandwidth reservation is reduced.

BRIEF DESCRIPTION OF THE DRAWINGS

FIG. 18 is a diagram showing the configuration of an optical access network of a conventional digital content downloading system;

DETAILED DESCRIPTION OF THE PREFERRED EMBODIMENTS

The invention will now be described with reference to the accompanying drawings.

Embodiment 1

Figure 1:
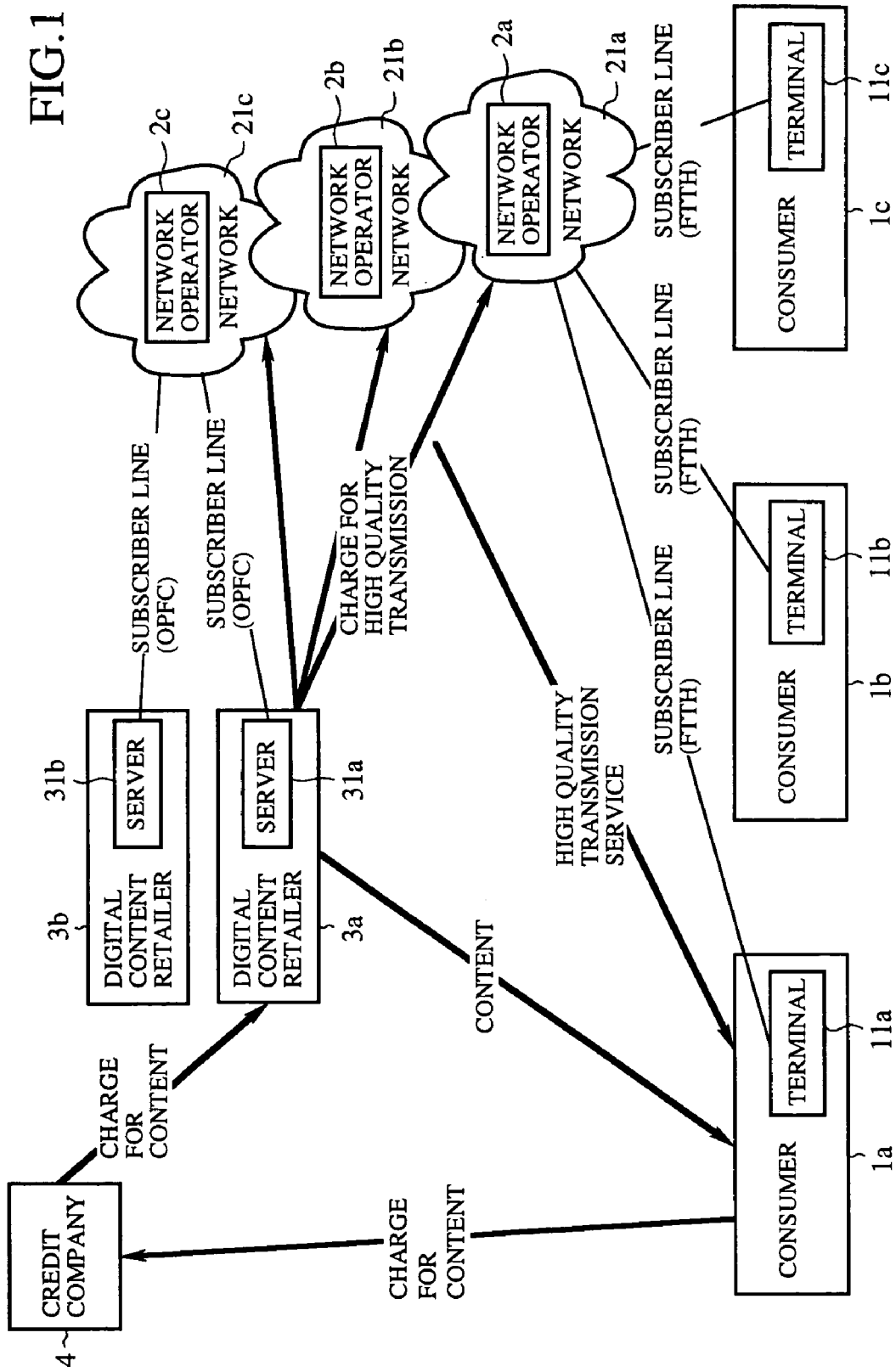
FIG. 1 is a diagram showing the configuration of a digital content downloading system using a network according to all embodiments of the present invention.

FIG. 1 is a diagram showing the configuration of a digital content downloading system using a network according to all embodiments of the present invention.

In FIG. 1, each of reference numerals 1a, 1b and 1c indicates a consumer who purchases digital content, and reference numerals 11a, 11b and 11c indicate a plurality of terminals respectively possessed by one of the consumers 1a, 1b and 1c. Each terminal denotes a personal computer with a normal internet function or the like. Reference numerals 3a and 3b indicate a plurality of digital content retailers for providing digital content such as music files, video files, game software titles and so on, and reference numerals 31a and 31b indicate a plurality of servers possessed by the digital content retailers 3a and 3b. Reference numerals 21a, 21b and 21c indicate a plurality of backbone networks arranged in series between the group of consumer 1a, 1b and 1c and the group of digital content retailers 3a and 3b, reference numerals 2a, 2b and 2c indicate a plurality of network operators respectively managing one of the backbone networks 21a, 21b and 21c, and a reference numeral 4 indicates a credit company for performing the authentication of the consumers 1a, 1b and 1c and performing the accounting relating to the provision of the digital content downloaded to each consumer.

Figure 2:
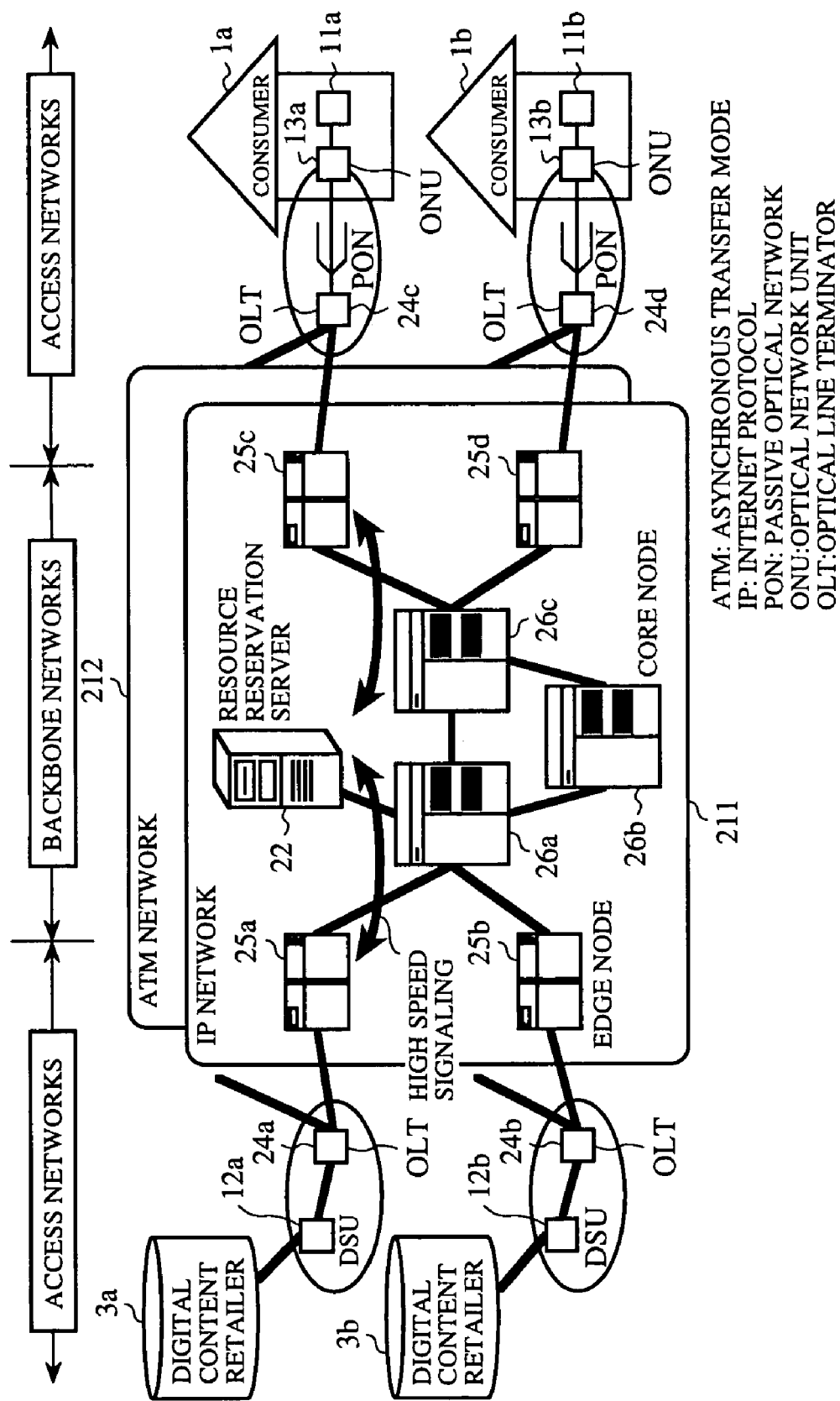
FIG. 2 is a diagram showing the configuration of backbone networks, access networks connecting consumers to the backbone networks and access networks connecting digital content retailers to the backbone networks according to a first embodiment of the present invention.

FIG. 2 is a diagram showing the configuration of the backbone networks 21a, 21b and 21c, access networks connecting the consumers to the backbone networks and access networks connecting the digital content retailers to the backbone networks according to a first embodiment of the present invention.

In FIG. 2, the reference numerals 1a and 1b indicate the consumers who purchase digital content, the reference numerals 11a and 11b indicate the terminals respectively possessed by one of the consumers 1a and 1b, each of reference numerals 13a and 13b indicates an optical network unit (ONU) which denotes a terminator of a branch subscriber line and is arranged in the house of one consumer, the reference numerals 3a and 3b indicate the digital content retailers who supply the digital content to the consumers 1a and 1b, and reference numerals 12a and 12b indicate a plurality of digital service units (DSU) denoting terminators of subscriber lines.

Also, a reference numeral 211 indicates an internet protocol (IP) network using an internet protocol (IP), and a reference numeral 212 indicates an asynchronous transfer mode (ATM) network using an asynchronous transfer mode (ATM). The backbone networks 21a, 21b and 21c have the IP network 211 and the ATM network 212. Reference numerals 24a, 24b, 24c and 24d indicate a plurality of optical line terminators (OLT), which are arranged in stations of the network operators 2a, 2b and 2c and are connected to the IP network 211 and the ATM network 212 of the backbone networks 21a, 21b and 21c, for terminating optical subscriber lines, a reference numeral 22 indicates a resource reservation server, arranged in the backbone networks 21a, 21b and 21c, for managing bandwidths (or transfer rates) of pieces of data transmitting through the subscriber lines and the backbone networks 21a, 21b and 21c and reserving a bandwidth of digital content transmitting through the subscriber lines and the backbone networks 21a, 21b and 21c in response to a bandwidth reservation request by one consumer, reference numerals 25a, 25b, 25c and 25d indicate a plurality of edge nodes through which information transmitted from the access networks is sent to the IP network 211 and the ATM network 212 of the backbone networks 21a, 21b and 21c, and reference numerals 26a, 26b and 26c indicate a plurality of core nodes in which information transmitted to the IP network 211 and the ATM network 212 of the backbone networks 21a, 21b and 21c are distributed at a high speed.

The access networks connecting the optical network units (ONU) of the consumers 1a and 1b to the optical line terminators (OLT) 24c and 24d are formed of optical access networks of the PON systems in which the asynchronous transfer mode (ATM) is used. That is, a plurality of consumers are connected to one optical line terminator (OLT) in each optical access network of the PON system. Also, the digital content retailers 3a and 3b are connected to optical line terminators (OLT) 24a and 24b through the access networks in one-to-one correspondence.

Because the access networks of the consumers 1a and 1b are formed of the passive optical network (PON) system, the access networks function as high speed optical networks made at a low cost. In this PON system, a broadcast type information is transmitted from the optical line terminators (OLT) 24c and 24d of the backbone network side to the consumers 1a and 1b through the optical fiber lines as a downward transmission. In contrast, pieces of information indicating requests of the consumers 1a and 1b are transmitted from the consumers 1a and 1b to the optical line terminators (OLT) 24c and 24d through the optical fiber lines as an upward transmission while a time slot is allocated to each of the pieces of information to prevent the collision of the pieces of information with each other.

Figure 3:
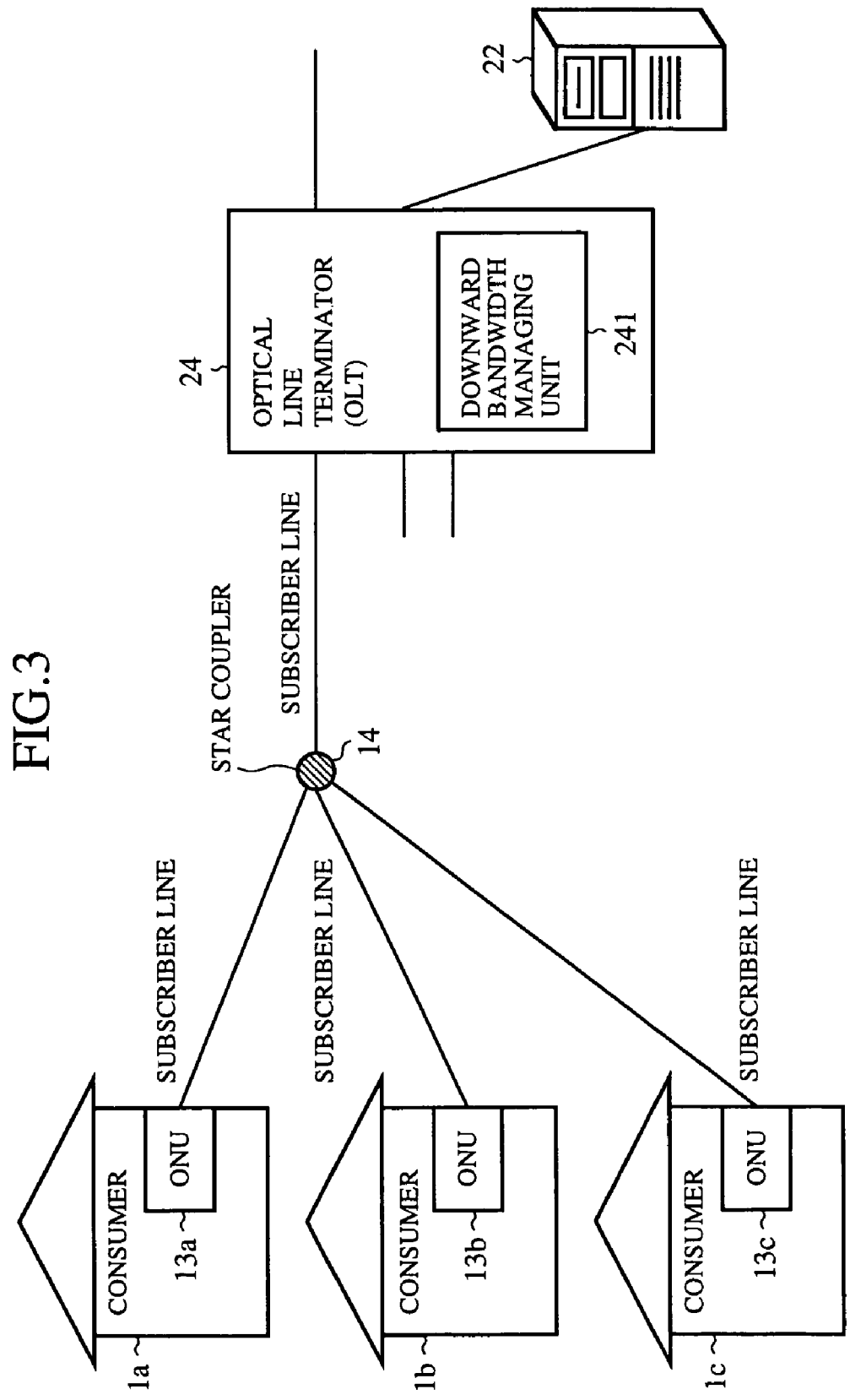
FIG. 3 is a diagram showing a passive optical network (PON) system according to the first embodiment of the present invention.

FIG. 3 is a diagram showing the passive optical network (PON) system according to the first embodiment of the present invention.

In FIG. 3, the reference numeral 22 indicates the resource reservation server for managing bandwidths (or transfer rates) of pieces of data transmitting through the subscriber lines and the backbone networks 21a, 21b and 21c and reserving a bandwidth of digital content transmitting through the subscriber lines and the backbone networks 21a, 21b and 21c in response to a bandwidth reservation request by one consumer 1 (representing 1a, 1b and 1c), and a reference numeral 241 indicates a downward bandwidth managing unit, arranged in the optical line terminator (OLT) 24 representing the optical line terminators (OLT) 24c and 24d, for controlling the downloading of one digital content from one digital content retailer possessing the digital content to the optical network unit (ONU) 13 of the consumer 1 to make the digital content of a downward signal be transmitted from the backbone networks 21a, 21b and 21c to the consumer through the subscriber lines at the bandwidth reserved in the resource reservation server 22. When a bandwidth reservation of the subscriber lines and the backbone networks 21a, 21b and 21c is completed in the resource reservation server 22, information of an allowable data transmission bandwidth, an allowable data transmission time zone and an allowable transmission data capacity is sent from the resource reservation server 22 to the downward bandwidth managing unit 241. Thereafter, the control of a data transfer rate is performed in the downward bandwidth managing unit 241 according to the allowable data transmission bandwidth, the allowable data transmission time zone and the allowable transmission data capacity. The other configuration and operation in FIG. 3 are the same as those in FIG. 18.

Figure 4:
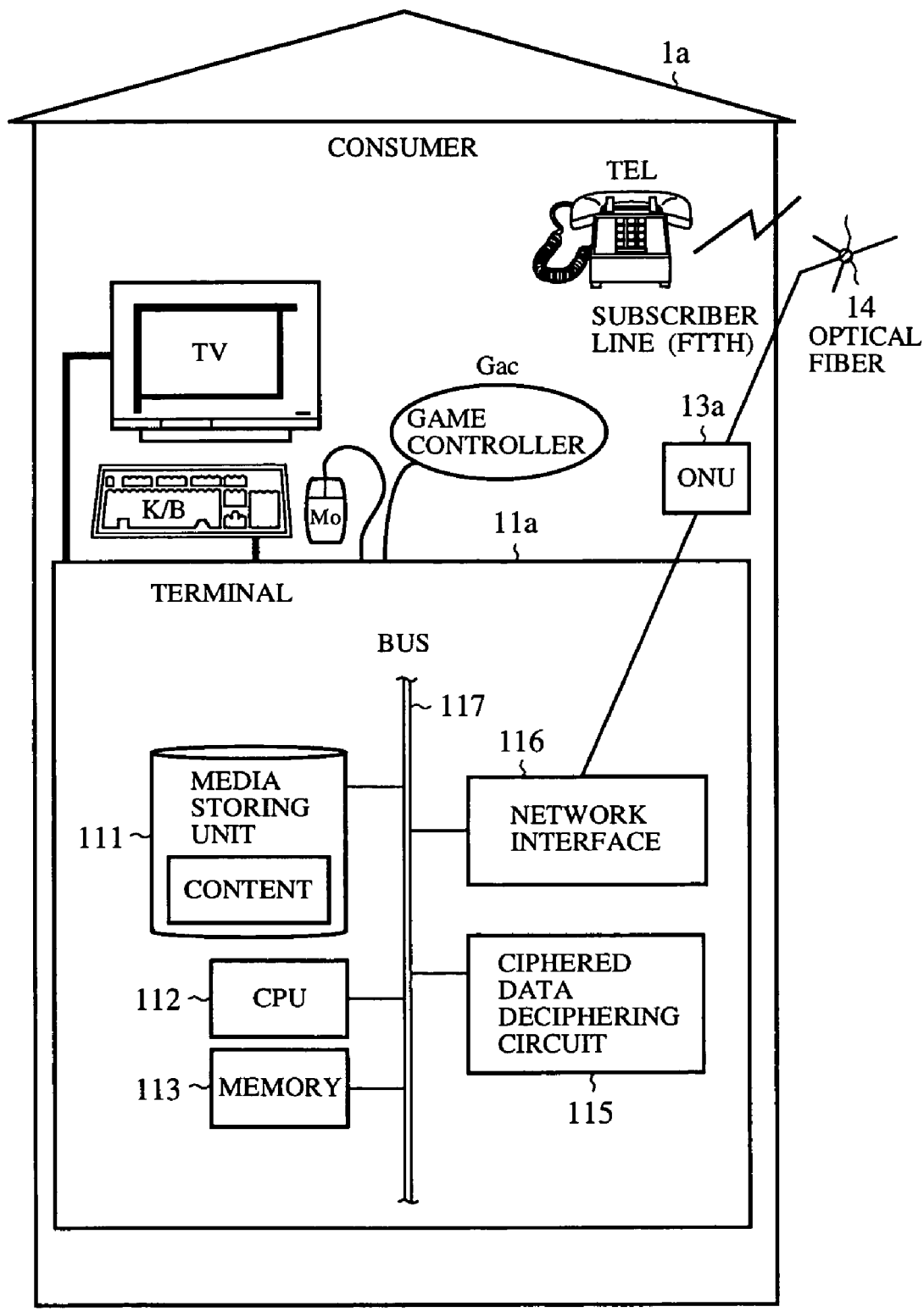
FIG. 4 is a block diagram of a terminal possessed by a consumer according to the first embodiment of the present invention.

FIG. 4 is a block diagram of the terminal 11a possessed by the consumer 1a. The terminal 11a represents the terminals 11a, 11b and 11c possessed by the consumers 1a, 1b and 1c in FIG. 4.

The reference numeral 13a indicates the optical network unit (ONU) connecting the subscriber line to the terminal 11a. A reference numeral 111 indicates a media storing unit, having a large data capacity, for storing digital content such as music files, video files, game software titles and so on so as to be optically or magnetically writable and readable. A reference numeral 112 indicates a central processing unit (CPU) for controlling the operation of the terminal 11a, a reference numeral 113 indicates a memory for storing data required to operate the CPU 112, a reference numeral 115 indicates a ciphered data deciphering circuit for deciphering ciphered digital content, a reference numeral 116 indicates a network interface through which information received in the optical network unit (ONU) 13a is received in the terminal 11a and information of the terminal 11a is transmitted to the optical network unit (ONU) 13a, and a reference numeral 117 indicates a bus of the terminal 11a.

The terminal 11a with a game control function of a game controller Gac is connected to a keyboard K/B, a mouse Mo and a home television TV functioning as a display to display the digital content. Also, the optical network unit (ONU) 13a is connected to the star coupler 14 through a two-way subscriber line FTTH formed of an optical fiber. In this embodiment, a fiber-to-the-home (FTTH) type two-way subscriber line is only arranged to connect the optical network unit (ONU) 13a to the star coupler 14. However, the consumer 1a can still install a normal telephone line in addition to the fiber-to-the-home subscriber line.

Next, an operation of the digital content downloading system using the network is described with reference to FIG. 5.

Figure 5:
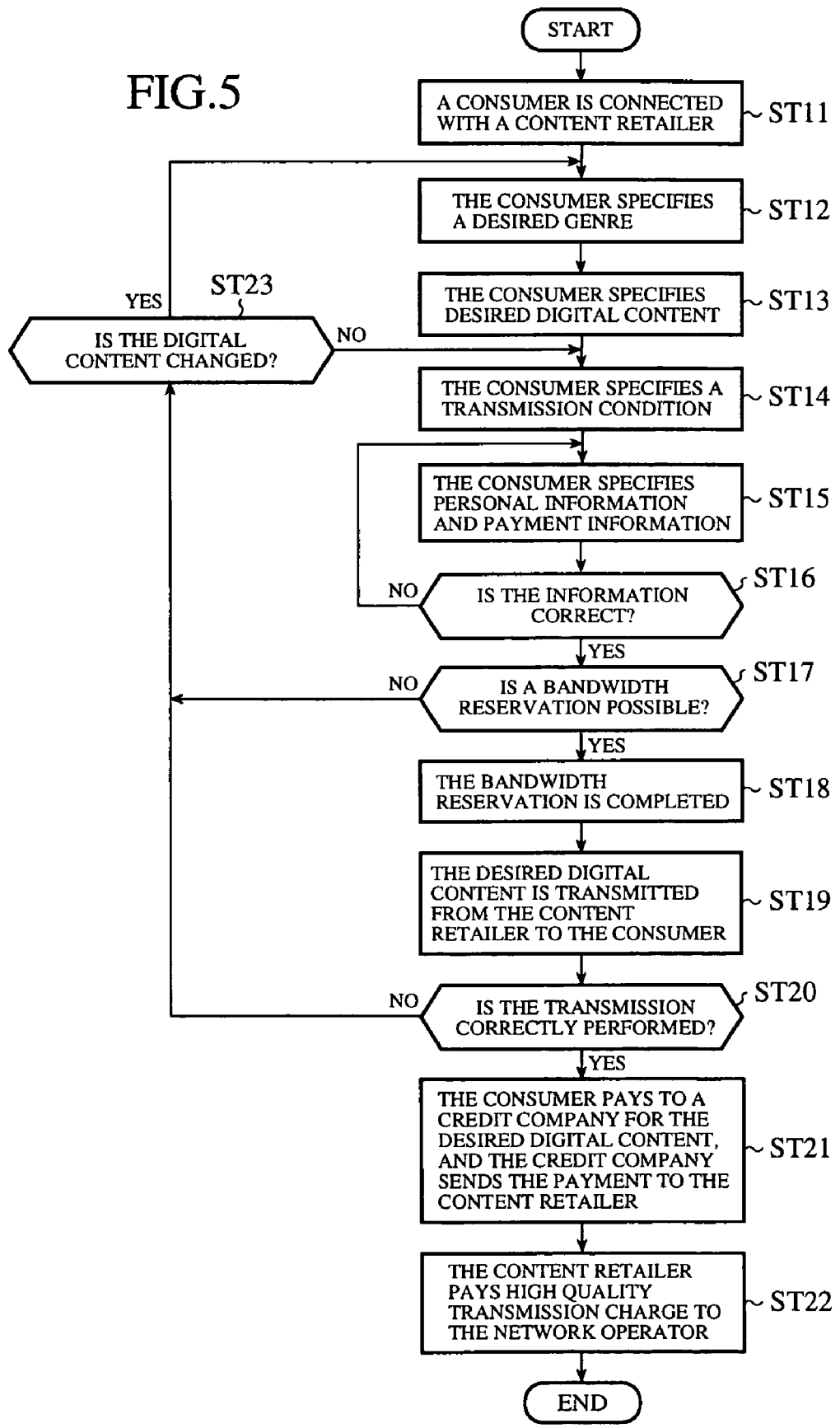
FIG. 5 is a flow chart showing the procedure performed in the digital content downloading system using the network according to the first embodiment of the present invention.

FIG. 5 is a flow chart showing the procedure performed in the digital content downloading system using the network.

In a step ST11, the terminal 11a of the consumer 1a is connected to the server 31a of the digital content retailer 3a through the backbone networks 21a, 21b and 21c. When a request of a bandwidth reservation of the subscriber lines and the backbone networks 21a, 21b and 21c is sent from the consumer 1a to the digital content retailer 3a to receive a desired digital content from the digital content retailer 3a through the backbone networks 21a, 21b and 21c, a genre menu of digital content is transmitted from the server 31a of the digital content retailer 3a to the terminal 11a of the consumer 1a to display the genre menu on the television TV.

In a step ST12, the consumer 1a specifies a desired genre from the genres of the genre menu displayed on the television TV, and the desired genre is transmitted to the server 31a of the digital content retailer 3a. Therefore, a content menu of the desired genre specified by the consumer 1a is transmitted from the server 31a of the digital content retailer 3a to the terminal 11a of the consumer 1a.

In a step ST13, digital content of the content menu are displayed on the television TV, the consumer 1a selects a desired digital content from the digital content of the content menu, and the consumer 1a informs the digital content retailer 3a of the desired digital content. Therefore, a transmission condition menu of the desired digital content is transmitted from the server 31a of the digital content retailer 3a to the terminal 11a of the consumer 1a. For example, a bandwidth guarantee type transmission conditions, in which a short transmission time period is guaranteed, and a bandwidth no-guarantee type transmission conditions, in which a transmission time period is not guaranteed, are listed in the transmission condition menu. Each transmission condition of the transmission condition menu corresponds to a communication quality of each digital content transmitting through and the subscriber lines and the backbone networks 21a, 21b and 21c, and the communication quality is determined according to transmission conditions (for example, a data transfer rate (or a bandwidth), a delay time, a delay variation, a burst size, a cell interval, a cell discard rate and so on) of the digital content transmitting through the subscriber lines and the backbone networks 21a, 21b and 21c. The charge for the downloading of one digital content becomes higher as the communication quality of the digital content becomes high.

In a step ST14, the consumer 1a specifies a desired transmission condition selected from transmission conditions of the transmission condition menu displayed on the television TV, and the consumer 1a informs the digital content retailer 3a of the desired transmission condition.

Therefore, an authentication request is transmitted from the server 31a of the digital content retailer 3a to the terminal 11a of the consumer 1a.

In a step ST15, the consumer 1a specifies personal information such as a membership number and payment information such as a payment method to log-in to the server 31a of the digital content retailer 3a while viewing the authentication image displayed on the television TV, the personal information and the payment information specified by the consumer 1a are sent to the server 31a of the digital content retailer 3a, and an authentication request based on the personal information and the payment information is sent from the server 31a of the digital content retailer 3a to the credit company 4 to inquires of the credit company 4 whether or not the personal information and the payment information specified by the consumer 1a are correct.

In a step ST16, it is judged in the credit company 4 whether or not the personal information and the payment information specified by the consumer 1a are correct. In cases where the personal information and the payment information of the consumer 1a are correct, an authentication completion notice is sent from the credit company 4 to the digital content retailer 3a.

In a step ST17, in cases where the authentication completion notice is received from the credit company 4, a request of the bandwidth reservation for the subscriber lines and the backbone networks 21a, 21b and 21c is sent from the server 31a of the digital content retailer 3a to the resource reservation server 22 of the network operators 2a, 2b and 2c to transmit the desired digital content to the consumer 1a at the desired transmission condition specified by the consumer 1a, and the server 31a of the digital content retailer 3a inquires of the resource reservation server 22 whether or not the bandwidth reservation for the subscriber lines and the backbone networks 21a, 21b and 21c is possible at the desired transmission condition.

In cases where it is judged in the resource reservation server 22 that the bandwidth reservation is impossible at the desired transmission condition, the bandwidth reservation at the desired transmission condition is rejected in the resource reservation server 22. Therefore, a bandwidth reservation impossible notice is transmitted from the resource reservation server 22 to the digital content retailer 3a, the bandwidth reservation impossible notice is transmitted from the server 31a of the digital content retailer 3a to the consumer 1a, and the digital content retailer 3a inquires of the consumer 1a whether or not the consumer 1a changes the desired digital content (step ST23). In cases where the consumer 1a changes the desired digital content, the steps ST12 to ST17 are again performed. In contrast, in cases where the consumer 1a does not change the desired digital content, the consumer 1a specifies another desired transmission condition in the step ST14, the authentication of the consumer 1a is confirmed in the steps ST15 and ST16, the server 31a of the digital content retailer 3a inquires of the resource reservation server 22 whether or not the bandwidth reservation is possible at the desired transmission condition newly specified (step ST17).

In a step ST18, in cases where it is judged in the resource reservation server 22 that the bandwidth reservation at the desired transmission condition (or the desired transmission condition newly specified) is possible in the step ST17, the bandwidth reservation is accepted in the resource reservation server 22, so that the bandwidth reservation is successfully completed. Thereafter, a bandwidth reservation possible notice is sent from the resource reservation server 22 to the digital content retailer 3a.

In a step ST19, when data of the desired digital content ciphered in the server 31a of the digital content retailer 3a is transmitted to the terminal 11a of the consumer 1a through the backbone networks 21a, 21b and 21c of the network operators 2a, 2b and 2c, the downward bandwidth managing unit 241 arranged in the optical line terminator (OLT) 24 (representing 24c and 24d, and refer to FIG. 3) controls a downward signal, in which the ciphered data of the desired digital content is included, according to the bandwidth reservation accepted in the resource reservation server 22. Therefore, the ciphered data of the desired digital content is included at the desired transmission condition in the downward signal, and the downward signal is transmitted from the server 31a of the digital content retailer 3a to the consumer 1a through the subscriber lines and the networks 21a, 21b and 21c. In the consumer 1a, the ciphered data of the desired digital content is extracted from the downward signal and is received in the optical network unit (ONU) 13a. The ciphered data of the desired digital content is transmitted to the terminal 11a of the consumer 1a.

Figure 6:
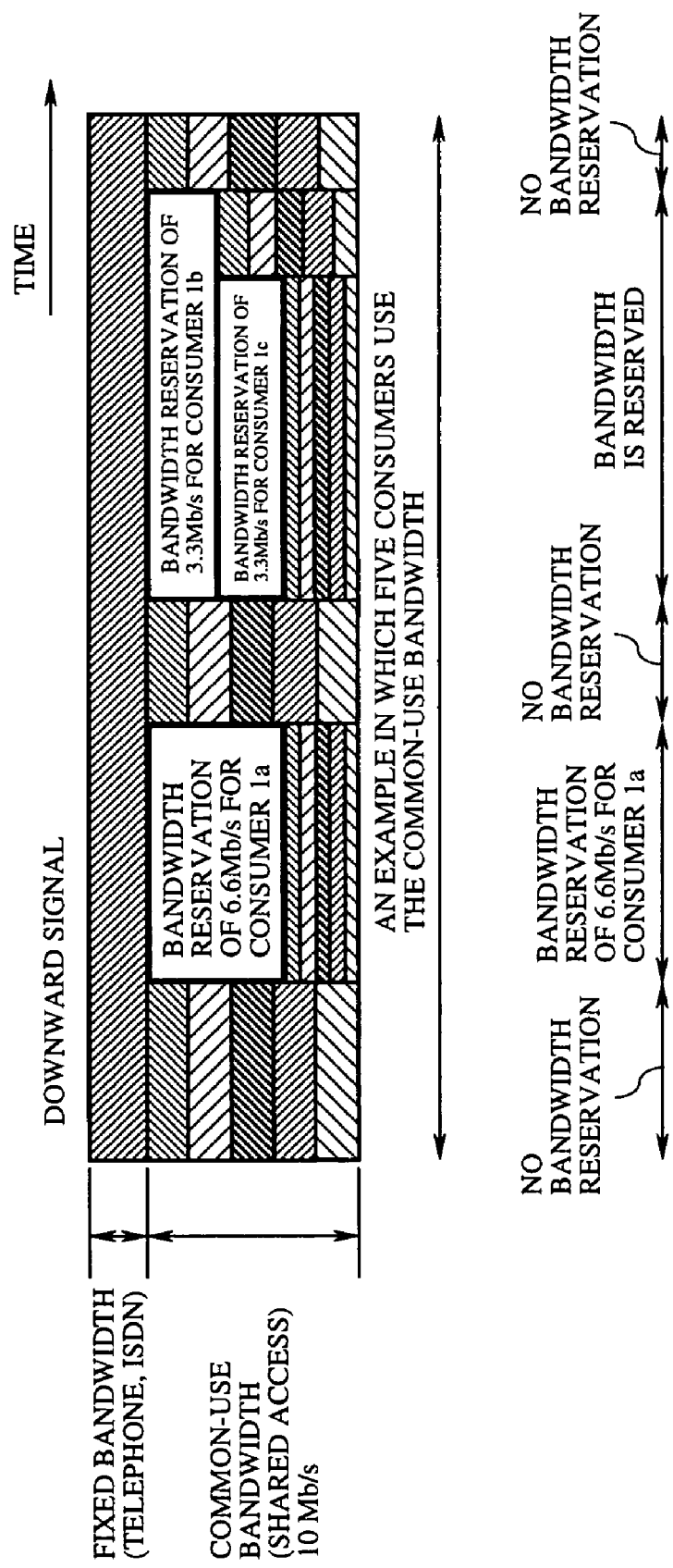
FIG. 6 is a diagram showing an example of a downward signal, which includes digital content according to bandwidth reservations and transmits through a subscriber line, according to the first embodiment of the present invention.

FIG. 6 is a diagram showing an example of a downward signal, which includes digital content according to bandwidth reservations performed in the resource reservation server 22 and transmits through a subscriber line, according to the first embodiment of the present invention.

As shown in FIG. 6, a first bandwidth is guaranteed (or reserved) in the shared bandwidth of one subscriber line by the resource reservation server 22 as a first bandwidth reservation in response to a request by the consumer 1a, and a first digital content of a downward signal transmitting through the subscriber line is downloaded from the backbone networks 21a, 21b and 21c to the consumer 1a at a first transmission condition (that is, a data transfer rate of 6.6 Mb/s and a first time zone) according to the first bandwidth reservation. A second bandwidth is guaranteed in the shared bandwidth of the subscriber line by the resource reservation server 22 as a second bandwidth reservation in response to a request by the consumer 1b, and a second digital content of the downward signal is downloaded from the backbone networks 21a, 21b and 21c to the consumer 1b at a second transmission condition (that is, a data transfer rate of 3.3 Mb/s and a second time zone) according to the second bandwidth reservation. Also, a third bandwidth is guaranteed in the shared bandwidth of the subscriber line by the resource reservation server 22 as a third bandwidth reservation in response to a request by the consumer 1c, and a third digital content of the downward signal is downloaded from the backbone networks 21a, 21b and 21c to the consumer 1c at a third transmission condition (that is, a data transfer rate of 3.3 Mb/s and a third time zone overlapping with the second time zone) according to the third bandwidth reservation.

Thereafter, in a step ST20 shown in FIG. 5, the ciphered data of the desired digital content is deciphered in the ciphered data deciphering circuit 115 of the terminal 11a, and the desired digital content deciphered is stored in the media storing unit 111. Thereafter, it is checked in the CPU 112 whether or not the desired digital content is correctly downloaded to the terminal 11a. In cases where the desired digital content is not correctly downloaded, the consumer 1a judges in the step ST23 whether or not the desired digital content is changed to another one. In cases where the consumer 1a desires to change the desired digital content to another one, the steps ST12 to ST20 are repeated. In contrast, in cases where the consumer 1a desires not to change the desired digital content, the steps ST14 to ST20 are repeated.

In cases where the desired digital content is successfully downloaded in the step ST20, a reception completed notice is sent from the terminal 11a to the server 31a of the digital content retailer 3a, and a transmission completion notice is sent from the server 31a of the digital content retailer 3a to the resource reservation server 22.

In a step ST21, an accounting request for the transmission of the desired digital content is transmitted from the server 31a of the digital content retailer 3a to the credit company 4, an accounting for the transmission of the desired digital content from the digital content retailer 3a to the consumer 1a is performed in the credit company 4, an accounting completion notice is sent from the credit company 4 to the server 31a of the digital content retailer 3a, and the accounting completion notice is sent from the server 31a of the digital content retailer 3a to the terminal 11a of the consumer 1a. Thereafter, because one of the bandwidth guarantee type transmission conditions is selected as the desired transmission condition by the consumer 1a, a digital content bill, in which a charge for the desired digital content itself and a high quality transmission charge corresponding to the desired transmission condition of the desired digital content are written, is sent from the credit company 4 to the terminal 11a of the consumer 1a, the consumer 1a pays the charge for the desired digital content itself and the high quality transmission charge to the credit company 4 by using the terminal 11a to settle an account with the digital content retailer 3a, and the credit company 4 sends the payment of the consumer 1a corresponding to the charge for the desired digital content itself and the high quality transmission charge to the server 31a of the digital content retailer 3a.

In a step ST22, the digital content retailer 3a pays the high quality transmission charge to the network operators 2a, 2b and 2c. This high quality transmission charge differs from a line charge for the use of the subscriber lines of the backbone networks 21a, 21b and 21c, and the line charge for the use of the subscriber lines is paid to the network operators 2a, 2b and 2c by the consumer 1a.

Accordingly, in this first embodiment, because the resource reservation server 22 reserves a particular bandwidth of the subscriber lines for the transmission of the desired digital content in response to a request by a particular consumer, the particular consumer can exclusively use the particular bandwidth of the subscriber lines in a prescribed time zone, so that the desired digital content can be downloaded from a digital content retailer possessing the desired digital content to the particular consumer. Therefore, a probability that the desired digital content specified by the particular consumer is successfully downloaded to the particular consumer in the down direction can be increased, a time period required for the downloading of the desired digital content in the down direction can be easily predicted, and an operational efficiency for the downloading of the desired digital content in the down direction can be improved.

Embodiment 2

Figure 7:
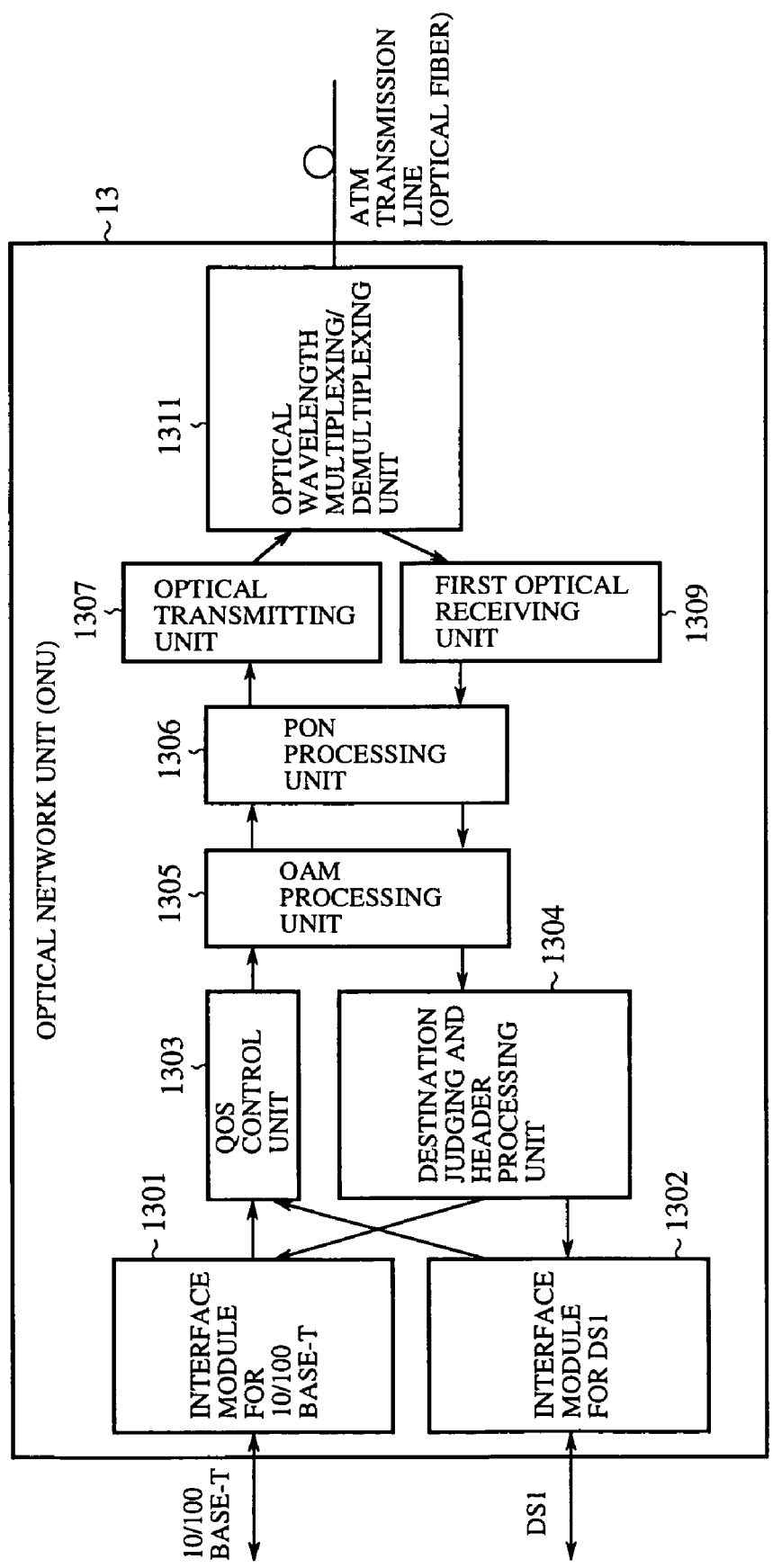
FIG. 7 is a block diagram of an optical network unit (ONU) in a passive optical network (PON) system, in which a asynchronous transfer mode (ATM) is used for a subscriber line connecting each optical network unit (ONU) to the backbone networks, according to a second embodiment of the present invention.

FIG. 7 is a block diagram of the optical network unit (ONU) in the passive optical network (PON) system, in which the asynchronous transfer mode (ATM) is used for the subscriber line connecting each optical network unit (ONU) to the backbone network 21a, according to a second embodiment of the present invention. In the optical network unit (ONU) 13 representing the optical network units (ONU) 13a, 13b and 13c, the optical fiber placed on the transmission line side is terminated, and various communication apparatuses arranged in a consumer's house or office are connected to each other. In FIG. 7, the optical network unit (ONU) 13 comprises an interface module 1301 for 10/100 BASE-T of the Ethernet utilized in a local area network (LAN), an interface module 1302 for a digital signal of the level 1 (DS1) utilized for a leased circuit service, a quality-of-service (QOS) control unit 1303, a destination judging and header processing unit 1304, an operation, administration and management (OAM) processing unit 1305, a passive optical network (PON) processing unit 1306, an optical transmitting unit 1307, a first optical receiving unit 1309 and an optical wavelength multiplexing and demultiplexing unit 1311 connected to an ATM subscriber line.

In each of the interface modules 1301 and 1302, an ATM cell format of data transmitting through the ATM subscriber line is converted into a format matching with a terminal connected to the interface module. In general, the terminal 11 connected to the optical network unit (ONU) 13 receives a signal output from the interface module 1301. Also, various types of interfaces can be provided for the optical network unit (ONU) 13 by changing interface modules 1301 and 1302 with other modules.

In the QOS control unit 1303, a transfer rate of upward data transmitted from the optical network unit (ONU) 13 is controlled not to excessively transmit the upward data through the ATM subscriber line and the backbone networks 21a, 21b and 21c. That is, the upward data is transmitted according to parameters contracted in advance with the consumer 1 (representing the consumers 1a, 1b and 1c). Here, QOS characteristics are internationally standardized, and four service classes composed of the CBR class, the real time VBR class, the non-real time VBR class and the ABR/UBR class are prescribed in the ATM Forum.

In the destination judging and header processing unit 1304, pieces of reception data of a plurality of ATM cells transmitting through the ATM subscriber line are classified into first reception data to be transmitted to the interface module 1301 and second reception data to be transmitted to the interface module 1302 by judging the destination information of each piece of reception data. Also, to identify digital content retailers 3 (representing 3a and 3b) from which the pieces of reception data are transmitted, connection information written in headers of the ATM cells is rewritten. Therefore, the first reception data, of which the destination is a first terminal connected to the interface module 1301, is transmitted to the first terminal through the interface module 1301, and the second reception data, of which the destination is a second terminal connected to the interface module 1302, is transmitted to the second terminal through the interface module 1302.

The OAM processing unit 1305 informs the backbone networks 21a, 21b and 21c of a failure occurring in the ATM subscriber line or the optical network unit (ONU) 13. Also, the backbone networks 21a, 21b and 21c inform the OAM processing unit 1305 of a failure occurring in the backbone network 21a.

The PON processing unit 1306 has a data transmission timing control function for preventing the interference of upward data transmitted from this optical network unit (ONU) 13 with pieces of upward data transmitted from the other optical network units (ONU) 13 and a data reception filter function for extracting reception data, of which the destination is the consumer 1 of this optical network unit (ONU) 13, from various pieces of data transmitted to this optical network unit (ONU) 13. Also, in the PON system utilizing the ATM, because information of 3 bytes for the PON is added to an ATM cell of 53 bytes according to the international standards to form a frame of data, a format of the extracted data is converted into that matching with the frame. The specifications of the PON utilizing the ATM are determined in detail in the Full Service Access Networks (FSAN) as the international standards.

In the optical transmitting unit 1307, an on-off operation is performed for a laser beam according to an electric digital signal transmitted from the terminal 11*a* in the up direction to convert the electric digital signal into an upward optical signal.

In the optical wavelength multiplexing and demultiplexing unit 1311, the upward optical signals, which are obtained in the optical transmitting unit 1307, are multiplexed to produce an upward multiplexed optical signal. The upward multiplexed optical signal is transmitted to the backbone network 21*a* through the optical fiber of the ATM subscriber line. Also, a downward multiplexed optical signal (called the downward signal in the first embodiment) transmitted from the backbone network 21*a* through the optical fiber is demultiplexed to a plurality of downward optical signals.

In the first optical receiving unit 1309, each downward optical signal obtained in the optical wavelength multiplexing and demultiplexing unit 1311 is converted into an electric digital signal.

The ATM subscriber line extending from the network operator 2*a* to the house or office of the consumer 1 is formed of one optical fiber, and both the upward multiplexed optical signal and the downward multiplexed optical signal transmit through the optical fiber in a two-way multiplexing. To prevent the mixing of the upward multiplexed optical signal and the downward multiplexed optical signal, a wavelength of the upward multiplexed optical signal differs from that of the downward multiplexed optical signal. In general, the wavelength of the downward multiplexed optical signal is set to 1.55 μm, and the wavelength of the upward multiplexed optical signal is set to 1.3 μm. Therefore, in the optical wavelength multiplexing and demultiplexing unit 1311, the downward multiplexed optical signal having the wavelength of 1.55 μm is demultiplexed, and downward demultiplexed optical signals are sent to the first optical receiving unit 1309. Also, the upward optical signals having the wavelength of 1.3 μm are received from the optical transmitting unit 1307 and are multiplexed in the unit 1311.

Accordingly, in the second embodiment, because the ATM is used for the subscriber lines connecting each optical network unit (ONU) 13 to the backbone network 21*a*, various types of traffic such as an internet protocol (IP), frame relay and voice can be simultaneously processed in the ATM.

Also, because a short-length packet called a cell, in which a header of 3 bytes for the PON is added to the ATM cell of 53 bytes according to the international standards, is prepared in the PON processing unit 1306, data transmitting through the ATM subscriber line for each packet is received in the optical network unit (ONU) 13, and data is transmitted from the optical network unit (ONU) 13 to the ATM subscriber line for each packet. Therefore, the network operator 2 can control a transfer rate of data transmitting through the ATM subscriber line by checking the number of cells passing through the ATM subscriber line every unit time, so that the network operator 2 can easily guarantee a communication quality (that is, the QOS).

Also, because the network operator 2 can easily check the communication quality of the ATM subscriber line, the network operator 2 can reliably provide a high communication quality for the consumers. Therefore, the network operator 2 can additionally obtain a charge for the high communication quality by guaranteeing the communication at the high communication quality to the consumers, so that the network operator 2 can additionally obtain a profit. That is, the ATM network having an appropriate network managing performance can be used as a strong tool for provisioning differentiated services.

Embodiment 3

Figure 8:
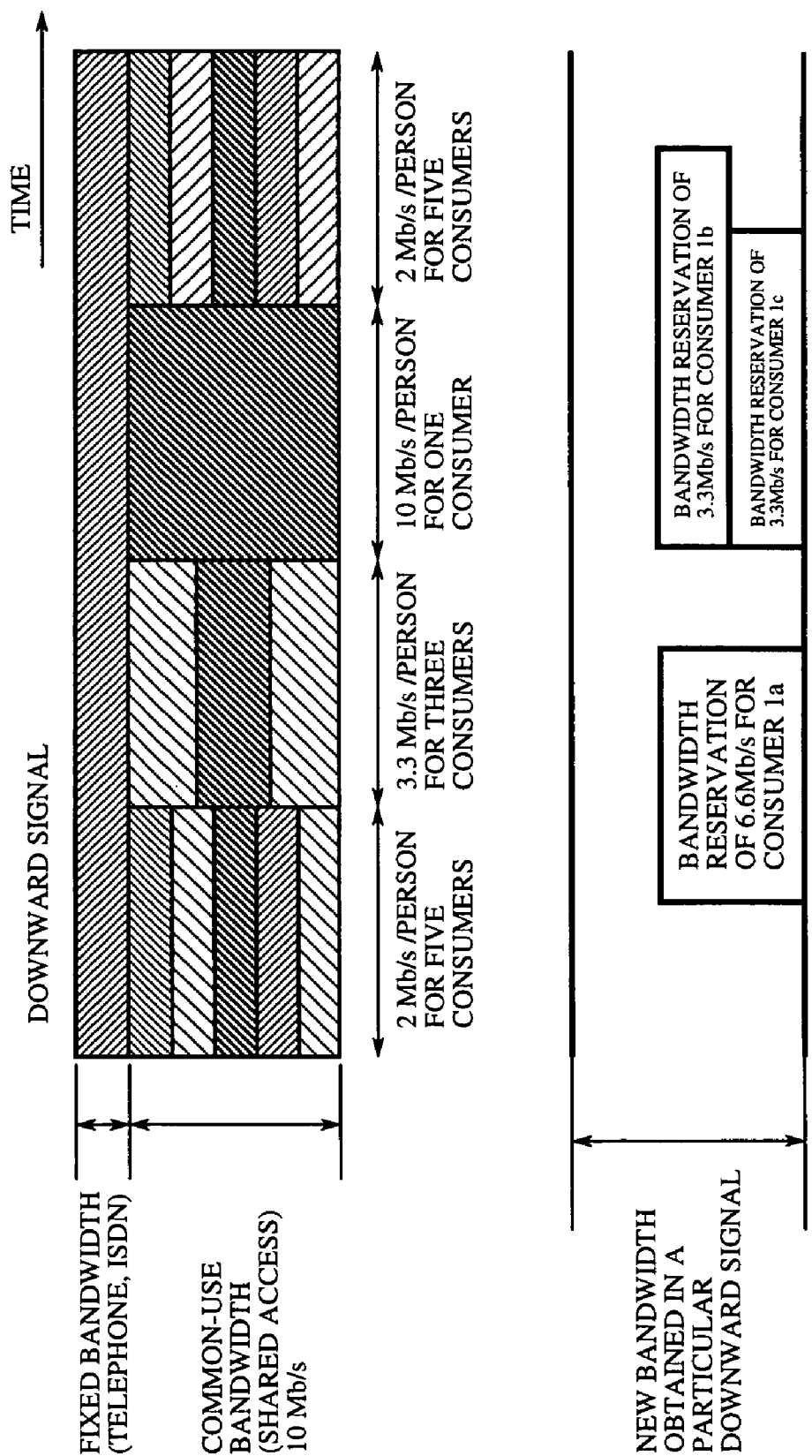
FIG. 8 is a diagram showing an example of a downward signal and a particular downward signal, which has a wavelength different from that of the downward signal and includes digital content according to bandwidth reservations, according to a third embodiment of the present invention.

FIG. 8 is a diagram showing an example of a downward signal and a particular downward signal, which has another wavelength different from that of the downward signal and includes digital content according to bandwidth reservations performed in the resource reservation server 22, according to a third embodiment of the present invention. The particular downward signal transmits through the same subscriber line as that of the downward signal.

Figure 20:
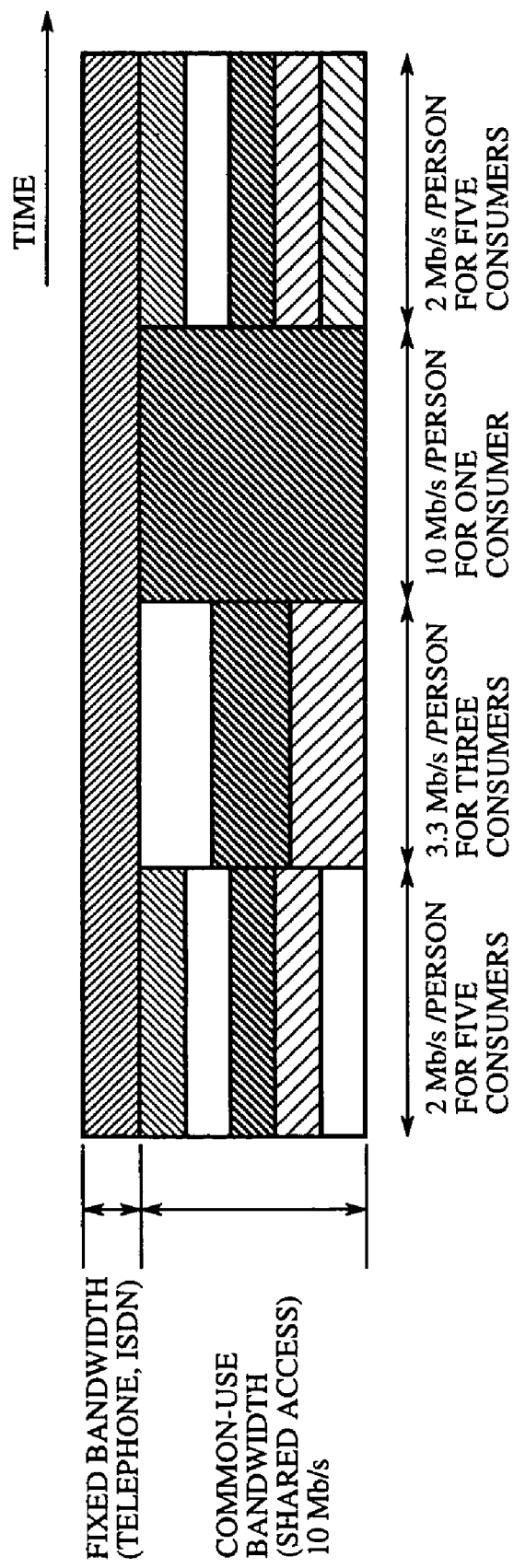
FIG. 20 is a diagram showing a conventional bandwidth utilizing example for one subscriber line.

As shown in FIG. 8, though a total bandwidth (or a total transfer rate) based on the downward signal is divided into the fixed bandwidth and the shared bandwidth in the same manner as that shown in FIG. 20, a particular downward signal, which has a particular wavelength different from that of the downward signal of the first embodiment, is prepared. Therefore, a total bandwidth (or a total transfer rate) based on the particular downward signal is used for the bandwidth reservation performed in the resource reservation server 22, and the total bandwidth in the particular downward signal is managed by the resource reservation server 22.

In detail, a first bandwidth is guaranteed (or reserved) in the bandwidth based on the particular downward signal by the resource reservation server 22 as a first bandwidth reservation in response to a request by the consumer 1*a*, and a first digital content reserved for the consumer 1*a* is downloaded from the backbone networks 21*a*, 21*b* and 21*c* to the consumer 1*a* at a first transmission condition (that is, a data transfer rate of 6.6 Mb/s and a first time zone) according to the first bandwidth reservation. A second bandwidth is guaranteed in the bandwidth based on the particular downward signal by the resource reservation server 22 as a second bandwidth reservation in response to a request by the consumer 1*b*, and a second digital content reserved for the consumer 1*b* is downloaded from the backbone networks 21*a*, 21*b* and 21*c* to the consumer 1*b* at a second transmission condition (that is, a data transfer rate of 3.3 Mb/s and a second time zone) according to the second bandwidth reservation. Also, a third bandwidth is guaranteed in the bandwidth based on the particular downward signal by the resource reservation server 22 as a third bandwidth reservation in response to a request by the consumer 1*c*, and a third digital content reserved for the consumer 1*c* is downloaded from the backbone networks 21*a*, 21*b* and 21*c* to the consumer 1*c* at a third transmission condition (that is, a data transfer rate of 3.3 Mb/s and a third time zone overlapping with the second time zone) according to the third bandwidth reservation.

Accordingly, in the third embodiment, because a bandwidth based on a particular downward signal having a wavelength different from that of the downward signal is newly prepared for the bandwidth reservation and is managed by the resource reservation server 22, in cases where a bandwidth reservation is received in the resource reservation server 22 in response to a request by a particular consumer 1, a particular bandwidth of the subscriber lines for the transmission of a desired digital content relating to the bandwidth reservation is guaranteed in the bandwidth based on the particular downward signal, so that the desired digital content can be downloaded to the terminal 11 of the particular consumer 1 without influencing on the consumers who use the shared bandwidth based on the downward signal.

Also, because the particular consumer can exclusively use a particular bandwidth based on the particular downward signal in a prescribed time zone by making the resource reservation server 22 receive a bandwidth reservation in response to a request by the particular consumer, a probability that the desired digital content specified by the particular consumer is successfully downloaded to the particular consumer in the down direction can be increased, a time period required for the downloading of the desired digital content in the down direction can be easily predicted, and an operational efficiency for the downloading of the desired digital content in the down direction can be improved.

Embodiment 4

Figure 9:
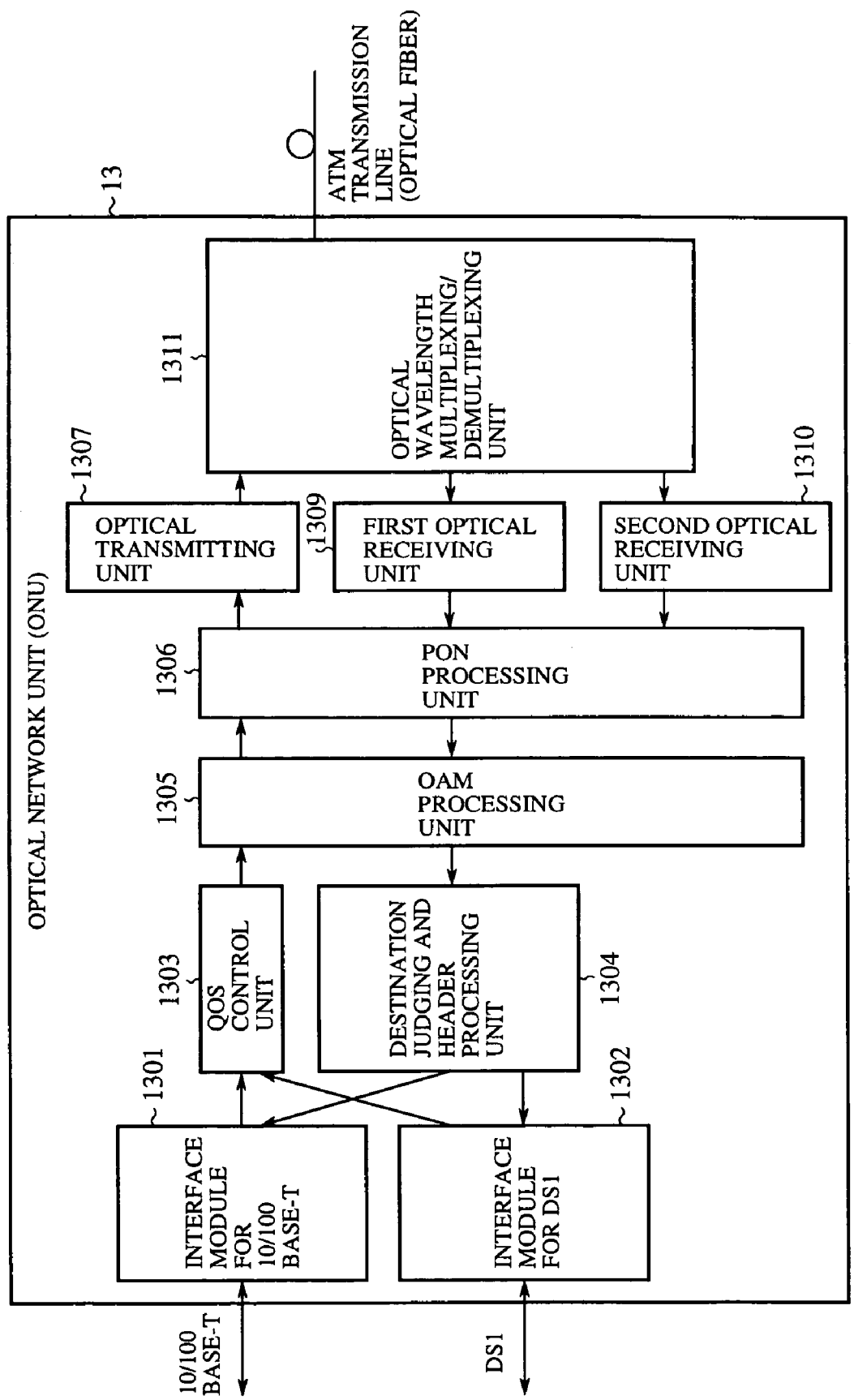
FIG. 9 is a block diagram of an optical network unit (ONU) in a passive optical network (PON) system, in which the asynchronous transfer mode (ATM) is used for the subscriber line, according to a fourth embodiment of the present invention.

FIG. 9 is a block diagram of the optical network unit (ONU) in the passive optical network (PON) system, in which the asynchronous transfer mode (ATM) is used for the subscriber line, according to a fourth embodiment of the present invention.

An ATM subscriber line extending from the network operator 2a to the consumer 1 is formed of one optical fiber in the same manner as in the second embodiment, and the upward multiplexed optical signal, the downward multiplexed optical signal and a particular downward multiplexed optical signal used for the bandwidth reservation transmit through the optical fiber in a two-way multiplexing. To prevent the mixing of the upward multiplexed optical signal, the downward multiplexed optical signal and the particular downward multiplexed optical signal, the optical signals have wavelengths differing from one another. In general, the wavelength of the downward multiplexed optical signal is set to 1.55 µm, the wavelength of the upward multiplexed optical signal is set to 1.3 µm, and the wavelength of the particular downward multiplexed optical signal for the bandwidth reservation is set to 0.9 µm by considering a transmission characteristic of the particular downward multiplexed optical signal in the optical fiber.

In the optical wavelength multiplexing and demultiplexing unit 1311, the downward multiplexed optical signal having the wavelength of 1.55 µm and the particular downward multiplexed optical signal having the wavelength of 0.9 µm are respectively demultiplexed, downward optical signals is sent to the first optical receiving unit 1309, and particular downward optical signals is sent to a second optical receiving unit 1310. Also, the upward optical signals having the wavelength of 1.3 µm are received from the optical transmitting unit 1307 and are multiplexed in the optical wavelength multiplexing and demultiplexing unit 1311.

In the first optical receiving unit 1309, an electric digital signal is produced from each downward optical signal obtained in the optical wavelength multiplexing and demultiplexing unit 1311. Also, in the second optical receiving unit 1310, an electric digital signal is produced from each particular downward optical signal obtained in the optical wavelength multiplexing and demultiplexing unit 1311.

The other configuration and operation in the optical network unit (ONU) 13 are the same as those in the second embodiment.

Accordingly, even though the particular downward multiplexed optical signal for the bandwidth reservation is additionally received in the optical network unit (ONU) 13, because the asynchronous transfer mode (ATM) is used for the subscriber line, various types of digital content can be simultaneously transmitted through the ATM subscriber line, the network operator 2 can easily guarantee a communication quality, and the ATM network having an appropriate network managing performance can be used as a strong tool for provisioning differentiated services in the same manner as in the second embodiment.

Embodiment 5

Figure 10:
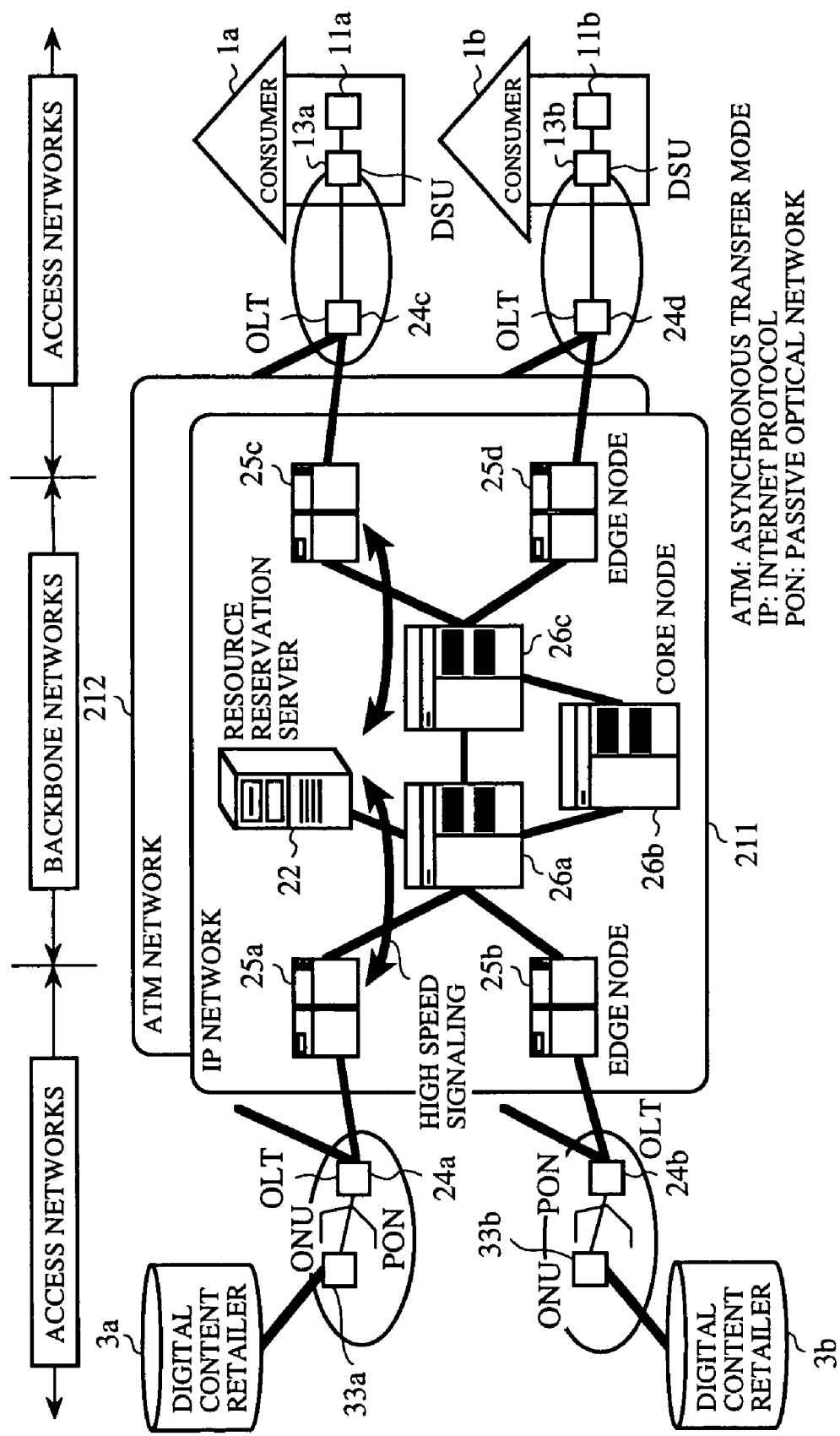
FIG. 10 is a diagram showing the configuration of backbone networks, access networks connecting consumers to the backbone networks and access networks connecting digital content retailers to the backbone networks according to a fifth embodiment of the present invention.

FIG. 10 is a diagram showing the configuration of the backbone networks 21a, 21b and 21c, access networks connecting consumers 1a and 1b to the backbone networks and access networks connecting digital content retailers 3a and 3b to the backbone networks according to a fifth embodiment of the present invention.

In the first embodiment shown in FIG. 2, the optical network units (ONU) 13a and 13b of the consumers 1a and 1b are connected to the optical line terminators (OLT) 24c and 24d in the PON systems. However, in the fifth embodiment shown in FIG. 10, the optical network units (ONU) 33a and 33b of the digital content retailers 3a and 3b are connected to the optical line terminators (OLT) 24a and 24b in the PON systems in which the asynchronous transfer mode (ATM) is used, and the digital service units (DSU) 12c and 12d of the consumers 1a and 1b are connected to the optical line terminators (OLT) 24c and 24d in the access networks in one-to-one correspondence. The other configuration of FIG. 10 is the same as that of FIG. 2.

In this PON system, pieces of data are transmitted from the optical line terminators (OLT) 24a and 24b of the backbone network side to the digital content retailers 3a and 3b through the optical fiber lines as a downward transmission. In contrast, pieces of data such as digital content are transmitted from the digital content retailers 3a and 3b to the optical line terminators (OLT) 24a and 24b through the subscriber lines formed of the optical fiber lines as an upward transmission while a time slot is allocated to each of the pieces of data to prevent the collision of the pieces of data with each other.

Figure 11:
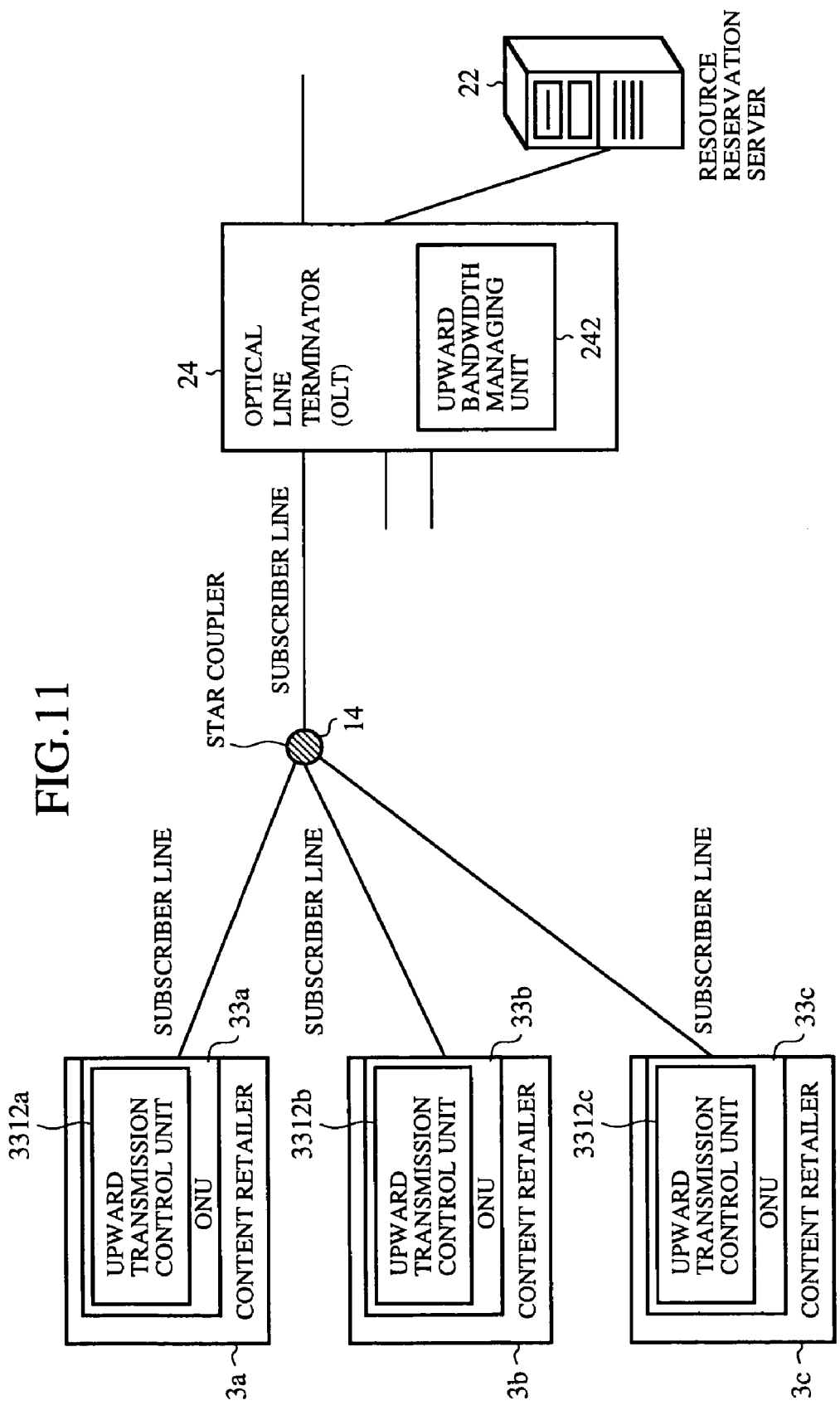
FIG. 11 is a diagram showing the passive optical network (PON) system according to the fifth embodiment of the present invention.

FIG. 11 is a diagram showing the passive optical network (PON) system according to the fifth embodiment of the present invention.

In FIG. 11, the reference numerals 3a, 3b and 3c indicate a plurality of digital content retailers who supply digital content, numerals 33a, 33b and 33c indicate a plurality of optical network units (ONU) arranged in the houses or offices of the digital content retailers 3a, 3b and 3c. The optical network units (ONU) 33a, 33b and 33c are connected to the servers 31a, 31b and 31c (refer to FIG. 1) which are called download sites and are possessed by the digital content retailers 3a, 3b and 3c. A large volume of file of digital content is downloaded from the download sites (or the servers 31a, 31b and 31c) to the consumers. Reference numerals 3312a, 3312b and 3312c indicate a plurality of upward transmission control units arranged in the optical network units (ONU) 33a, 33b and 33c. The reference numeral 22 indicates the resource reservation server, arranged in the backbone networks 21a, 21b and 21c, for managing bandwidths (or transfer rates) of pieces of data transmitting through the subscriber lines and the backbone networks 21a, 21b and 21c and reserving a bandwidth of digital content in the subscriber lines and the backbone networks 21a, 21b and 21c in response to a bandwidth reservation of one digital content retailer, and a reference numeral 242 indicates an upward bandwidth managing unit, arranged in each optical line terminator (OLT) 24 (representing 24a and 24b), for controlling the information of an upward signal transmitted in the up direction according to the bandwidth reservation of the resource reservation server 22. The other configuration of FIG. 11 is the same as that in FIG. 3.

In the above configuration, when the bandwidth reservation received from one digital content retailer 3a is completed in the resource reservation server 22, an allowable data transmission bandwidth, an allowable data transmission time zone and an allowable transmission data capacity are sent from the resource reservation server 22 to the upward bandwidth managing unit 242 of the OLT 24. Therefore, the allowable data transmission bandwidth, the allowable data transmission time zone and the allowable transmission data capacity are transferred from the upward bandwidth managing unit 242 to the upward transmission control unit 3312a and are sent to the server 31a of the digital content retailer 3a by the function of the upward transmission control unit 3312a.

Figure 12:
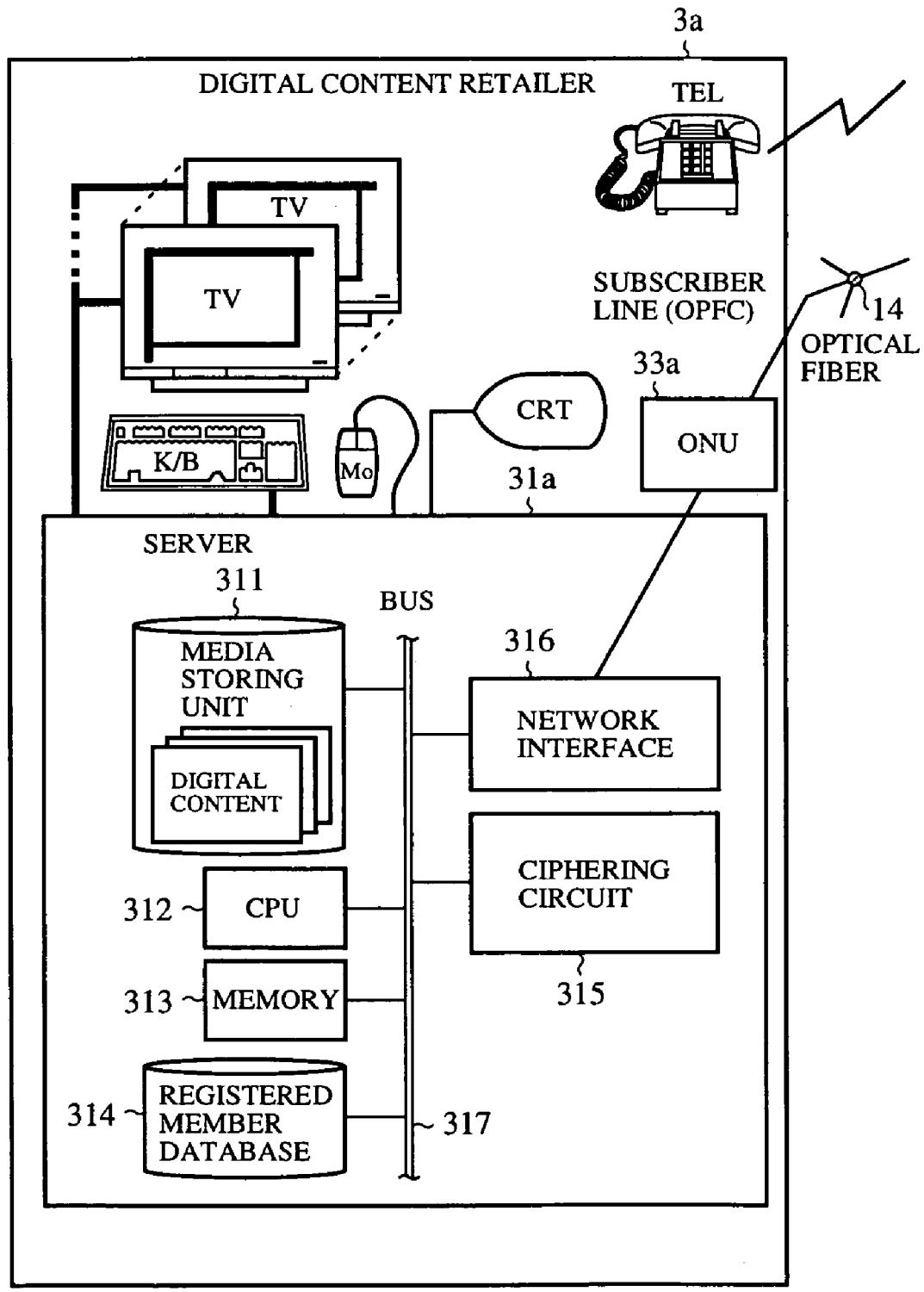
FIG. 12 is a block diagram of a server possessed by a digital content retailer.

FIG. 12 is a block diagram of the server 31a possessed by the digital content retailer 3a. The server 31a represents the servers 31a and 31b possessed by the digital content retailers 3a and 3b in FIG. 12.

In FIG. 12, a reference numeral 311 indicates a media storing unit, having a large data capacity, for storing digital content as services, a reference numeral 312 indicates a central processing unit (CPU) for controlling the server 31a, a reference numeral 313 indicates a memory for storing data to be used for the operation of the CPU 312, a reference numeral 314 indicates a registered member data base for storing membership information to be used to recognize the registered members, a reference numeral 315 indicates a ciphering circuit for ciphering digital content to be downloaded to registered members, a reference numeral 316 indicates a network interface, a reference numeral 317 indicates a bus of the server 31a, and the reference numeral 33a indicates the optical network unit (ONU) for connecting the network interface 316 to a subscriber line OPFC of the optical fiber.

Also, the server 31a is connected to a plurality of peripheral apparatuses such as a keyboard K/B, a mouse Mo, a display CRT and a plurality of home televisions TV for monitoring the digital content to be downloaded. Also, a telephone TEL is arranged to receive a request by one registered member.

Figure 13:
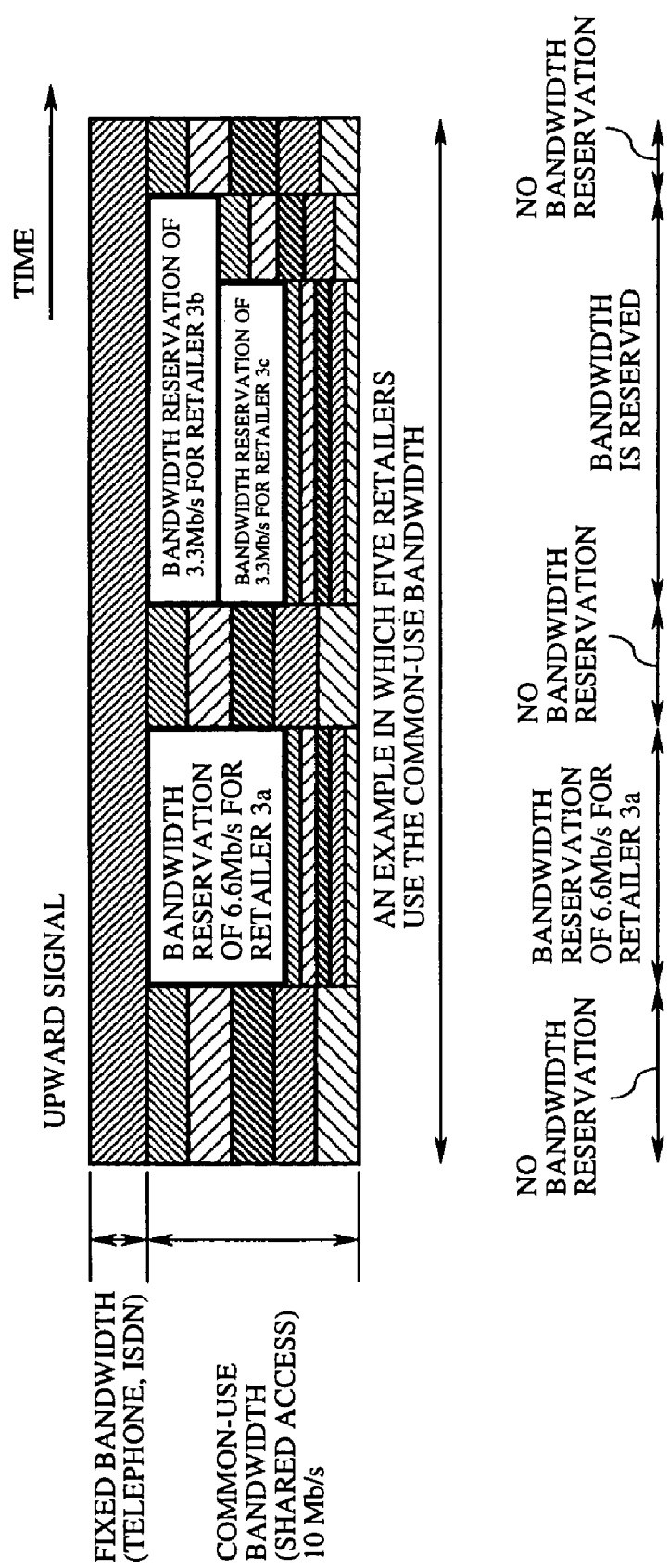
FIG. 13 is a diagram showing an example of an upward signal, which includes digital content according to bandwidth reservations and transmits through a subscriber line, according to the fifth embodiment of the present invention.

FIG. 13 is a diagram showing an example of an upward signal, which includes digital content according to bandwidth reservations performed in the resource reservation server 22 and transmits through a subscriber line, according to the fifth embodiment of the present invention.

As shown in FIG. 13, a first bandwidth is guaranteed in the shared bandwidth of one subscriber line by the resource reservation server 22 as a first bandwidth reservation in response to a request by the digital content retailer 3a, and a first digital content of an upward signal transmitting through the subscriber line is downloaded from the digital content retailer 3a to the backbone networks 21a, 21b and 21c at a first transmission condition (that is, a data transfer rate of 6.6 Mb/s and a first time zone) according to the first bandwidth reservation. A second bandwidth is guaranteed in the shared bandwidth of the subscriber line by the resource reservation server 22 as a second bandwidth reservation in response to a request by the digital content retailer 3b, and a second digital content of the upward signal is downloaded from the digital content retailer 3b to the backbone networks 21a, 21b and 21c at a second transmission condition (that is, a data transfer rate of 3.3 Mb/s and a second time zone) according to the second bandwidth reservation. Also, a third bandwidth is guaranteed in the shared bandwidth of the subscriber line by the resource reservation server 22 as a third bandwidth reservation in response to a request by the digital content retailer 3c, and a third digital content of the upward signal is downloaded from the digital content retailer 3c to the backbone networks 21a, 21b and 21c at a third transmission condition (that is, a data transfer rate of 3.3 Mb/s and a third time zone overlapping with the second time zone) according to the third bandwidth reservation.

Accordingly, in the fifth embodiment, because the resource reservation server 22 of the backbone network 21 reserves a particular bandwidth of a desired digital content in response to a request by a particular digital content retailer possessing the desired digital content, the particular digital content retailer can exclusively use the particular bandwidth of an upward signal in a prescribed time zone, so that the desired digital content included in the upward signal can be downloaded from the particular digital content retailer to a particular consumer through the backbone networks 21a, 21b and 21c. Therefore, a probability that the desired digital content is successfully downloaded from the particular digital content retailer to the backbone networks 21a, 21b and 21c in the up-direction can be increased, a time period required for the downloading of the desired digital content in the up-direction can be easily predicted, and an operational efficiency for the downloading of the desired digital content in the up-direction can be improved.

Embodiment 6

Figure 14:
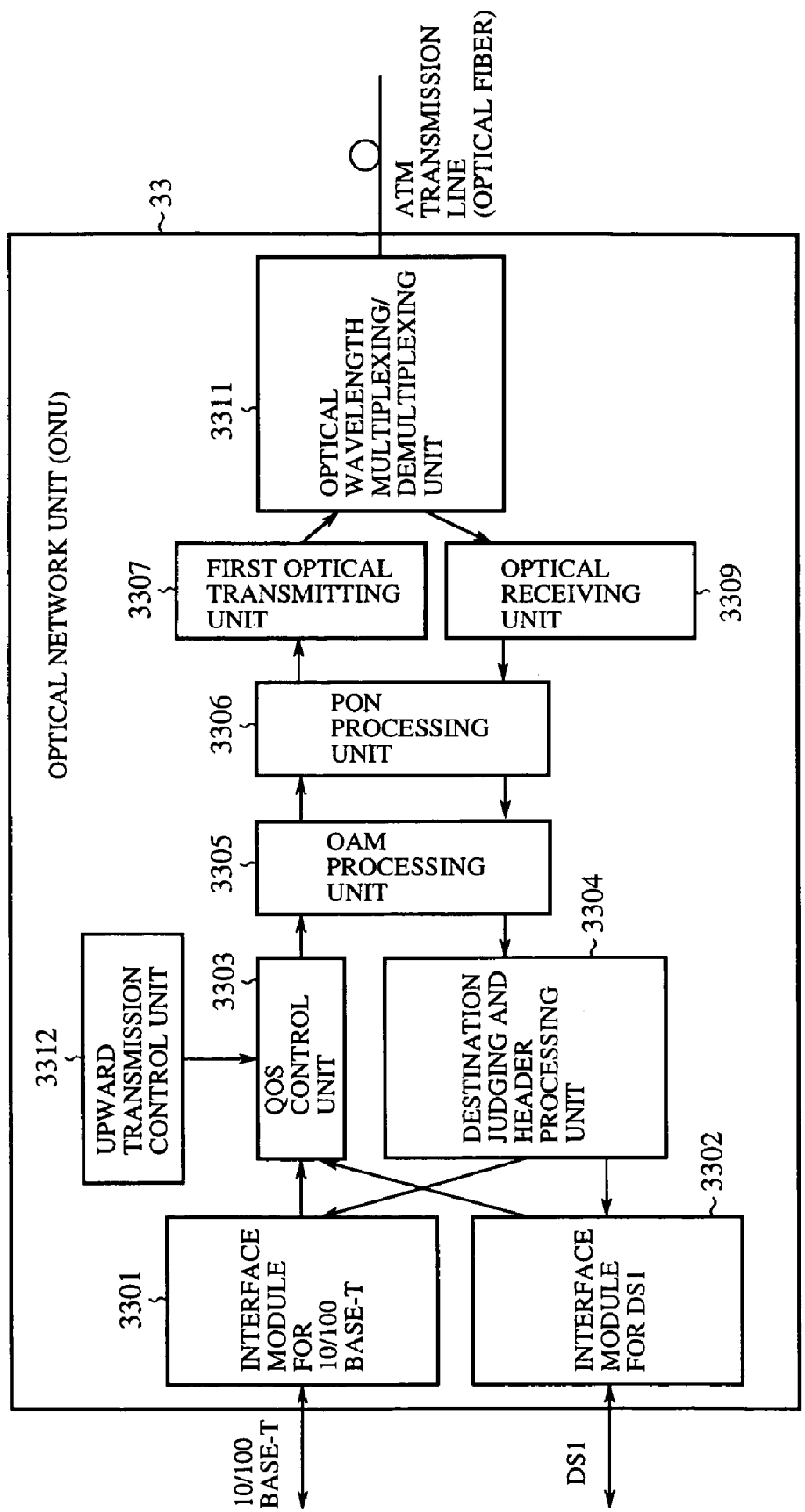
FIG. 14 is a block diagram of an optical network unit (ONU) in the passive optical network (PON) system, in which the asynchronous transfer mode (ATM) is used for the subscriber line, according to a sixth embodiment of the present invention.

FIG. 14 is a block diagram of the optical network unit (ONU) in the passive optical network (PON) system, in which the asynchronous transfer mode (ATM) is used for the subscriber line, according to a sixth embodiment of the present invention.

In FIG. 14, an interface module 3301 for 10/100 BASE-T, an interface module 3302 for the DS1, a quality-of-service (QOS) control unit 3303, a destination judging and header processing unit 3304, an operation, administration and management (OAM) processing unit 3305, a passive optical network (PON) processing unit 3306, a first optical transmitting unit 3307, an optical receiving unit 3309 and an optical wavelength multiplexing and demultiplexing unit 3311 arranged in the ONU 33 (representing 33a, 33b and 33c) have the same functions as those of the interface module 1301 for 10/100 BASE-T, the interface module 1302 for the DS1, the QOS control unit 1303, the destination judging and header processing unit 1304, the OAM processing unit 1305, the PON processing unit 1306, the optical transmitting unit 1307, the first optical receiving unit 1309 and the optical wavelength multiplexing and demultiplexing unit 1311 arranged in the ONU 13 of the second embodiment shown in FIG. 7.

For example, in the quality-of-service (QOS) control unit 3303, a transfer rate of data of the digital content received from the interface module 3301 or 3302 is controlled according to the bandwidth reservation received in the upward transmission control unit 3312.

When a bandwidth reservation request by a particular digital content retailer 3a is transmitted to the resource reservation server 22 of one network operator 2 (denoting one of the network operators 2a, 2b and 2c) so as to download desired digital content from the particular digital content retailer 3a to one consumer 1a through the backbone networks 21a, 21b and 21c of the network operators 2a, 2b and 2c at a desired transmission condition, the server 31a of the particular digital content retailer 3a inquires of the resource reservation server 22 whether or not the bandwidth reservation at the desired transmission condition is possible. In cases where it is judged in the resource reservation server 22 that the bandwidth reservation at the desired transmission condition is possible, the bandwidth reservation received from the particular digital content retailer 3a is accepted in the resource reservation server 22. Therefore, the bandwidth reservation at the desired transmission condition is completed in the resource reservation server 22. Thereafter, an allowable data transmission bandwidth, an allowable data transmission time zone and an allowable transmission data capacity are transmitted from the resource reservation server 22 to the upward bandwidth managing unit 242 of the OLT 24a. Therefore, the allowable data transmission bandwidth, the allowable data transmission time zone and the allowable transmission data capacity are transferred from the upward bandwidth managing unit 242 of the OLT 24a to the upward transmission control unit 3312a.

In FIG. 14, the upward transmission control unit 3312 (representing 3312a, 3312b and 3312c) controls the QOS control unit 3303 to perform the control of a data transfer rate according to the allowable data transmission bandwidth, the allowable data transmission time zone and the allowable transmission data capacity.

Accordingly, in the sixth embodiment, because the ATM is used for the subscriber lines connecting the optical network units (ONU) 33a and 33b of the digital content retailers 3a and 3b to the backbone networks 21a, 21b and 21c, various types of traffic such as an internet protocol (IP), frame relay and voice can be simultaneously processed in the ATM.

Also, the network operators 2a, 2b and 2c can respectively control a transfer rate of data transmitting through each ATM subscriber line by checking the number of cells passing through the ATM subscriber line every unit time, so that the network operators 2a, 2b and 2c can easily guarantee a communication quality (that is, the QOS) in the same manner as in the second embodiment.

Also, because the network operators 2a, 2b and 2c can easily check the communication quality of the ATM subscriber line, the ATM network having an appropriate network managing performance can be used as a strong tool for provisioning differentiated services in the same manner as in the second embodiment.

Embodiment 7

Figure 15:
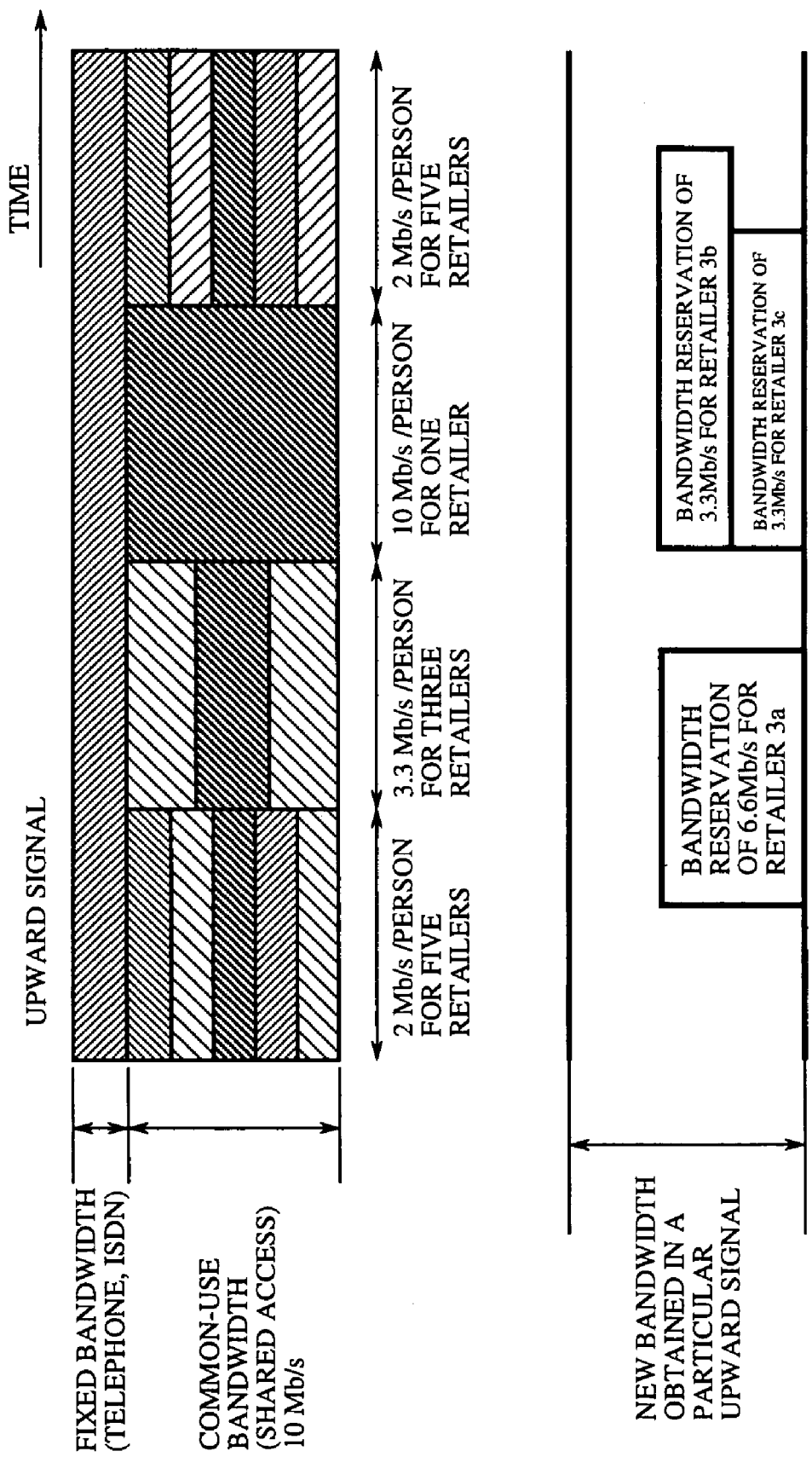
FIG. 15 is a diagram showing an example of an upward signal and a particular upward signal which has a wavelength different from that of the upward signal and includes digital content according to bandwidth reservations, according to a seventh embodiment of the present invention.

FIG. 15 is a diagram showing an example of an upward signal and a particular upward signal, which has a wavelength different from that of the upward signal and includes digital content according to bandwidth reservations performed in the resource reservation server 22, according to a seventh embodiment of the present invention. The particular upward signal transmits through the same subscriber line as that of the upward signal.

As shown in FIG. 15, though a total bandwidth (or a total transfer rate) based on the upward signal is divided into the fixed bandwidth and the shared bandwidth in the same manner as that shown in FIG. 20, a particular upward signal, which has a particular wavelength different from that of the upward signal of the fifth embodiment, is prepared. Therefore, a total bandwidth (or a total transfer rate) based on the particular upward signal is used for the bandwidth reservation performed in the resource reservation server 22, and the total bandwidth based on the particular upward signal is managed by the resource reservation server 22.

In detail, a first bandwidth is guaranteed in the bandwidth based on the particular upward signal by the resource reservation server 22 as a first bandwidth reservation in response to a request by the digital content retailer 3a, and a first digital content reserved the digital content retailer 3a is downloaded from the digital content retailer 3a to the backbone networks 21a, 21b and 21c at a first transmission condition (that is, a data transfer rate of 6.6 Mb/s and a first time zone) according to the first bandwidth reservation. A second bandwidth is guaranteed in the bandwidth based on the particular upward signal by the resource reservation server 22 as a second bandwidth reservation in response to a request by the digital content retailer 3b, and a second digital content reserved the digital content retailer 3b is downloaded from the digital content retailer 3b to the backbone networks 21a, 21b and 21c at a second transmission condition (that is, a data transfer rate of 3.3 Mb/s and a second time zone) according to the second bandwidth reservation. Also, a third bandwidth is guaranteed in the bandwidth based on the particular upward signal by the resource reservation server 22 as a third bandwidth reservation in response to a request by the digital content retailer 3c, and a third digital content reserved the digital content retailer 3c is downloaded from the digital content retailer 3c to the backbone networks 21a, 21b and 21c at a third transmission condition (that is, a data transfer rate of 3.3 Mb/s and a third time zone overlapping with the second time zone) according to the third bandwidth reservation.

Accordingly, in the seventh embodiment, because bandwidth based on a particular upward signal having a wavelength different from that of the upward signal is newly prepared for the bandwidth reservation and is managed by the resource reservation server 22, in cases where a bandwidth reservation is received in the resource reservation server 22 in response to a request by a particular digital content retailer 3, a particular bandwidth for the transmission of a desired digital content relating to the bandwidth reservation is guaranteed in the bandwidth based on the particular upward signal, so that the desired digital content can be downloaded to the backbone networks 21a, 21b and 21c without influencing on the digital content retailers who use the shared bandwidth in the upward signal.

Also, because the particular digital content retailer 3 can exclusively use the particular bandwidth based on the particular upward signal in a prescribed time zone by making the resource reservation server 22 receive a bandwidth reservation corresponding to a request by the particular digital content retailer 3, a probability that the desired digital content specified by a particular consumer is successfully downloaded to the backbone networks 21a, 21b and 21c in the up-direction can be increased, a time period required for the downloading of the desired digital content in the up-direction can be easily predicted, and an operational efficiency for the downloading of the desired digital content in the up-direction can be improved.

Embodiment 8

Figure 16:
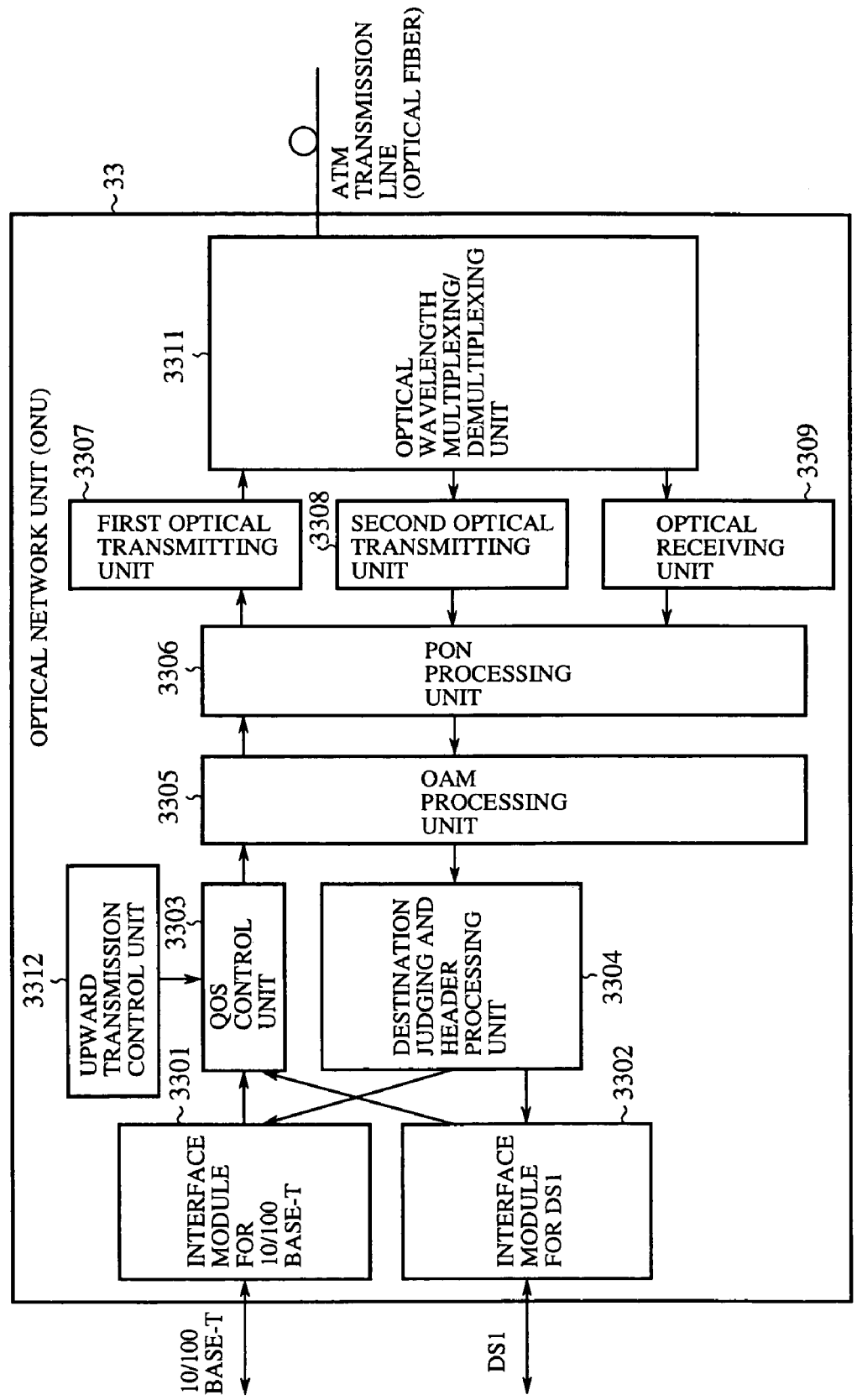
FIG. 16 is a block diagram of an optical network unit (ONU) in the passive optical network (PON) system, in which the asynchronous transfer mode (ATM) is used for the subscriber line, according to an eighth embodiment of the present invention.

FIG. 16 is a block diagram of the optical network unit (ONU) in the passive optical network (PON) system, in which the asynchronous transfer mode (ATM) is used for the subscriber line, according to an eighth embodiment of the present invention.

An ATM subscriber line extending from the network operator 2 to the digital content retailer 3 is formed of one optical fiber, and an upward multiplexed optical signal (called the upward signal in the seventh embodiment), a downward multiplexed optical signal and a particular upward multiplexed optical signal (called the particular upward signal in the seventh embodiment) used for the bandwidth reservation transmit through the optical fiber in a two-way multiplexing. To prevent the mixing of the upward multiplexed optical signal, the downward multiplexed optical signal and the particular upward multiplexed optical signal, the optical signals have wavelengths differing from each other. In general, the wavelength of the downward multiplexed optical signal is set to 1.55 µm, the wavelength of the upward multiplexed optical signal is set to 1.3 µm, and the wavelength of the particular upward multiplexed optical signal for the bandwidth reservation is set to 0.9 µm by considering a transmission characteristic of the particular upward multiplexed optical signal in the optical fiber.

In the first optical transmitting unit 3307, upward optical signals having the wavelength of 1.3 µm are transmitted to the optical wavelength multiplexing and demultiplexing unit 1311. Also, in a second optical transmitting unit 3308, particular upward optical signals having the wavelength of 0.9 µm are transmitted to the optical wavelength multiplexing and demultiplexing unit 1311.

In the optical wavelength multiplexing and demultiplexing unit 1311, the downward multiplexed optical signal having the wavelength of 1.55 µm is demultiplexed to output downward optical signals to the optical receiving unit 3309, the upward optical signals are multiplexed to the upward multiplexed optical signal, and the particular upward optical signals are multiplexed to the particular upward multiplexed optical signal for the bandwidth reservation.

The other configuration and operation in the optical network unit (ONU) 33 are the same as those in the sixth embodiment shown in FIG. 14.

Accordingly, in the eighth embodiment, even though the particular upward multiplexed optical signal for the bandwidth reservation is additionally produced in the optical network unit (ONU) 33, because the asynchronous transfer mode (ATM) is used for the subscriber line, various types of digital content can be simultaneously transmitted through the ATM subscriber line according to the bandwidth reservation, the network operator 2 can easily guarantee a communication quality, and the ATM network having an appropriate network managing performance can be used as a strong tool for provisioning differentiated services in the same manner as in the second embodiment.

Embodiment 9

Figures 17, 19:
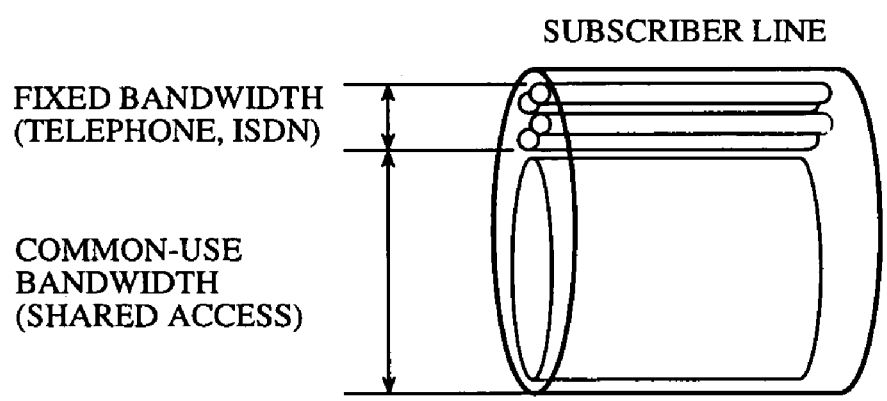
FIG. 17 shows an example of a charge table for the bandwidth reservation performed in an online operation in the digital content downloading system according to a ninth embodiment of the present invention.
FIG. 19 is a conceptual diagram of a bandwidth allocation in one subscriber line utilized in a PON system.

FIG. 17 shows an example of a rate-table for the bandwidth reservations performed in an online operation in the digital content downloading system according to a ninth embodiment of the present invention.

As shown in FIG. 17, a charge for the bandwidth reservation is determined by the network operator 2 according to a bandwidth (or a transfer rate) and a time zone which is used for the downloading of the digital content according to the bandwidth reservation.

The present invention is not limited to the used bandwidth and the used time zone for the determination of the charge. For example, it is preferred that the charge for the bandwidth reservation is determined by considering a used time period, a discount on a monthly basis, a flat-rate contract, a flat-rate cap contract or the like.

Also, it is preferred that the charge table shown in FIG. 17 is transmitted from the resource reservation server 22 to the consumers 1a, 1b and 1c or the digital content retailers 3a, 3b and 3c to make a contract for the bandwidth reservation with them.

Accordingly, because the charge for the bandwidth reservation is determined according to the used bandwidth and the used time zone, a probability that the digital content retailer or the consumer uselessly performs a bandwidth reservation is reduced, so that the digital content retailer or the consumer can efficiently use the bandwidth.

Also, because the network operator can accurately grasp the band using condition by making a contract for the bandwidth reservation with the digital content retailers and the consumers, the network operator can use the contract to determine a new construction of subscriber lines.

What is claimed is:

1. A digital content downloading system using a network in which digital content, possessed by a digital content retailer communicatively coupled to the network, is downloaded to one of a plurality of consumers through the network, comprising:
   a plurality of subscriber lines each formed of an optical fiber and arranged between the consumers and the network, the network being managed by a network operator;
   an optical line terminator, arranged on one side of the network, for terminating a subscriber line on the network side;
   an optical network unit, arranged on a side of each consumer, for terminating a subscriber line on the consumer side;
   a star coupler configured to connect the subscriber lines terminated by the optical network units to the subscriber line terminated by the optical line terminator;
   a resource reservation server configured to reserve a particular bandwidth for the digital content in the subscriber lines in response to a request by a particular consumer; and
   downward bandwidth managing means, arranged in the optical line terminator, for controlling downloading of the digital content from the digital content retailer to the optical network unit of the particular consumer so that the digital content is transmitted through the subscriber lines and the star coupler at the particular bandwidth reserved by the resource reservation server.

2. A digital content downloading system using a network according to claim 1, wherein the particular bandwidth for the digital content reserved in response to the request by the particular consumer by the resource reservation server is guaranteed in a shared bandwidth of the subscriber lines.

3. A digital content downloading system using a network according to claim 1, wherein the particular bandwidth for the digital content reserved by the resource reservation server in response to the request by the particular consumer is guaranteed in a first signal having a wavelength differing from that of a second signal corresponding to a shared bandwidth of the subscriber lines.

4. A digital content downloading system using a network according to claim 1, wherein the optical network unit arranged on the side of the particular consumer comprises:
   an optical wavelength demultiplexing unit configured to demultiplex a multiplexed optical signal of a first wavelength transmitting through the subscriber lines;
   a first optical receiving unit configured to receive a plurality of optical signals of the first wavelength demultiplexed by the optical wavelength demultiplexing unit and to convert the optical signals into a plurality of digital signals;

a passive optical network processing unit configured to extract data of the digital content from the digital signals obtained by the first optical receiving unit;

a plurality of interfaces, connected to a plurality of terminals in one-to-one correspondence, configured to respectively transmit data matching the corresponding terminal to the corresponding terminal; and a destination judging and header processing unit configured to judge the destination of the data of the digital content extracted by the passive optical network processing unit to determine a particular terminal to which the data of the digital content is downloaded, to perform header processing for the data of the digital content to identify the content retailer, and to transmit the data of the digital content to the particular terminal through one interface corresponding to the particular terminal.

5. A digital content downloading system using a network according to claim 1, wherein the optical network unit arranged on the side of the particular consumer comprises:

an optical wavelength demultiplexing unit configured to demultiplex a first multiplexed optical signal of a first wavelength transmitting through the subscriber line to a plurality of first optical signals of the first wavelength and to demultiplex a second multiplexed optical signal of a second wavelength transmitting through the subscriber line to a plurality of second optical signals of the second wavelength, the second multiplexed optical signal including data of the digital content of which the particular bandwidth is reserved by the resource reservation server;

a first optical receiving unit configured to receive the first optical signals of the first wavelength from the optical wavelength demultiplexing unit and to convert the first optical signals into a plurality of first digital signals;

a second optical receiving unit configured to receive the second optical signals of the second wavelength from the optical wavelength demultiplexing unit and to convert the second optical signals into a plurality of second digital signals;

a passive optical network processing unit configured to extract the data of the digital content from the second digital signals obtained by the second optical receiving unit;

a plurality of interfaces, connected to a plurality of terminals in one-to-one correspondence, configured to respectively transmit data matching the corresponding terminal to the corresponding terminal; and a destination judging and header processing unit configured to judge the destination of the data of the digital content extracted by the passive optical network processing unit to determine a particular terminal to which the data of the digital content is downloaded, to perform a header processing for the data of the digital content to identify the content retailer, and to transmit the data of the digital content to the particular terminal through one interface corresponding to the particular terminal.

6. A digital content downloading system using a network according to claim 1, wherein the content retailer is configured to charge the particular consumer for the downloading of the digital content according to the particular bandwidth reserved by the resource reservation server, a time period used for the downloading, or a time zone used for the downloading.

7. A digital content downloading system using a network according to claim 6, wherein information of charges corresponding to a bandwidth used for the downloading of data including the digital content, a time period used for the downloading of data including the digital content, or a time zone used for the downloading of data including the digital content is transmitted from the network operator to the consumers.

8. A digital content downloading system using a network according to claim 1, wherein the digital content is a music file, a video file, or a game software title.

9. The digital downloading system of claim 1, wherein the resource reservation server is arranged in the network separate from the optical line terminator and the optical network units.

10. The digital downloading system of claim 1, wherein the resource reservation server is configured to reserve the particular bandwidth so that the particular bandwidth is reserved from a particular start time to a particular end time.

11. A digital content downloading system using a network in which digital content, possessed by one of a plurality of content retailers communicatively coupled to the network, is downloaded to a consumer through the network, comprising:

a plurality of subscriber lines each formed of an optical fiber and arranged between the content retailers and the network, the network being managed by a network operator;

an optical line terminator, arranged on a side of the network, for terminating a subscriber line on the network side;

an optical network unit, arranged on a side of each content retailer, for terminating a subscriber line on the content retailer side;

a star coupler configured to connect the subscriber lines terminated by the optical network units to the subscriber line terminated by the optical line terminator;

a resource reservation server configured to reserve a particular bandwidth for the digital content in the subscriber lines for the downloading of the digital content to the consumer as a bandwidth reservation in response to a request by a particular content retailer;

upward bandwidth managing means, arranged in the optical line terminator, for receiving the bandwidth reservation from the resource reservation server; and upward transmission control means, arranged in the optical network unit of a particular content retailer, for controlling downloading of the digital content from the optical network unit of the particular content retailer to the consumer so that the digital content is transmitted through the subscriber lines and the star coupler at the particular bandwidth according to the bandwidth reservation received from the upward bandwidth managing means.

12. A digital content downloading system using a network according to claim 11, wherein the particular bandwidth for the digital content reserved in response to the request by the particular content retailer by the resource reservation server is guaranteed in a shared bandwidth of the subscriber lines.

13. A digital content downloading system using a network according to claim 11, wherein the particular bandwidth for the digital content reserved by the resource reservation server in response to the request by the particular content retailer is guaranteed in a first signal having a wavelength differing from that of a second signal corresponding to a shared bandwidth of the subscriber lines.

14. A digital content downloading system using a network according to claim 11, wherein the optical network unit arranged on the side of the particular content retailer, comprises:

an interface configured to receive data of the digital content from an external terminal;

a quality-of-service control unit configured to control the transmission of the data of the digital content received in the interface according to the bandwidth reservation received by the upward transmission control means;

a passive optical network processing unit configured to control a transmission timing of the data of the digital content, of which the transmission is controlled in the quality-of-service control unit, to prevent the interference of the data of the digital content with data transmitted from the other optical network units;

a first optical transmitting unit configured to convert the data of the digital content, of which the transmission timing is controlled in the passive optical network processing unit, into a plurality of optical signals having a first wavelength and transmitting the optical signals; and an optical wavelength multiplexing unit configured to multiplex the optical signals transmitted from the first optical transmitting unit to a multiplexed optical signal and to output the multiplexed optical signal to the corresponding subscriber line.

15. A digital content downloading system using a network according to claim 11, wherein the optical network unit arranged on the side of the particular content retailer, comprises:

an interface configured to receive first data and second data of the digital content from an external terminal;

a quality-of-service control unit configured to control the transmission of the first data and controlling the transmission of the second data of the digital content received in the interface according to the bandwidth reservation received by the upward transmission control means;

a passive optical network processing unit configured to control transmission timings of the first data and the second data of the digital content, of which the transmission is controlled in the quality-of-service control unit, to prevent the interference of the first data and the second data of the digital content with data transmitted from the other optical network units;

a first optical transmitting unit configured to convert the first data, of which the transmission timing is controlled in the passive optical network processing unit, into a plurality of first optical signals having a first wavelength and transmitting the first optical signals;

a second optical transmitting unit configured to convert the data of the digital content, of which the transmission timing is controlled in the passive optical network processing unit, into a plurality of second optical signals having a second wavelength, differing from the first wavelength and to transmit the second optical signals; and an optical wavelength multiplexing unit configured to multiplex the first optical signals transmitted from the first optical transmitting unit to a first multiplexed optical signal, to multiplex the second optical signals transmitted from the second optical transmitting unit to a second multiplexed optical signal, and to output the first multiplexed optical signal and the second multiplexed optical signal to the corresponding subscriber line.

16. A digital content downloading system using a network according to claim 11, wherein the network operator charges the particular content retailer for the downloading of the digital content according to the particular bandwidth reserved by the resource reservation server, a time period used for the downloading, or a time zone used for the downloading.

17. A digital content downloading system using a network according to claim 16, wherein information of charges corresponding to a bandwidth used for the downloading of data including the digital content, a time period used for the downloading of data including the digital content, or a time zone used for the downloading of data including the digital content is transmitted from the network operator to the content retailers.

18. A digital content downloading system using a network according to claim 11, wherein the digital content is a music file, a video file, or a game software title.

\* \* \* \* \*